United States Patent
Shirane

(10) Patent No.: US 6,246,537 B1
(45) Date of Patent: Jun. 12, 2001

(54) RECORDING MEDIUM, METHOD AND APPARATUS UTILIZING CIRCULAR LOGICAL BLOCK ADDRESS ASSOCIATION

(75) Inventor: Kyoichi Shirane, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/248,872

(22) Filed: Feb. 11, 1999

(30) Foreign Application Priority Data

Feb. 18, 1998 (JP) .................................................. 10-036286
Nov. 30, 1998 (JP) .................................................. 10-340720

(51) Int. Cl.$^7$ .................................................. G11B 5/596
(52) U.S. Cl. .................................. 360/78.08; 360/78.14; 360/135; 360/53; 360/49; 360/72.2
(58) Field of Search .............................. 360/78.14, 78.08, 360/135, 53, 49, 72.2; 711/4, 112, 111; 714/701, 769, 770; 369/32, 33

(56) References Cited

U.S. PATENT DOCUMENTS

| 5,223,993 | * | 6/1993 | Squires et al. | 360/77.08 |
| 5,940,242 | * | 8/1999 | Lee | 360/78.14 |
| 6,105,104 | * | 8/2000 | Guttmann et al. | 360/78.08 |

\* cited by examiner

*Primary Examiner*—Alan T. Faber
(74) *Attorney, Agent, or Firm*—Oblon, Spivak, McClelland, Maier & Neustadt, P.C.

(57) ABSTRACT

A disc-shaped recording medium for magnetically recording information signals, in which logical block addresses are associated with the recording tracks on the disc in such a sequence in which the logical block addresses proceed in a recordable information area towards the outer rim side, with a first recording track at a mid portion between the innermost recording track and the outermost recording track on the lower disc surface as a logical starting point, until reaching a second recording track, the logical block addresses then proceeding from a third recording track at a mid portion between the innermost recording track and the outermost recording track on the upper disc surface towards the inner rim side as far as a fourth recording track, the logical block addresses then proceeding towards the outer rim side from the next recording track of the second recording track on the lower disc surface lying towards the outer rim side, as far as the outermost recording track on the lower disc surface, the logical block addresses then proceeding from the outermost recording track on the upper disc surface towards the inner rim, to skip the third and fourth recording tracks, until reaching the innermost recording track on the upper disc surface, the logical block addresses then proceeding from the innermost rim on the lower disc surface towards the outer rim side as far as the recording track directly ahead of the first recording track. This structure gives a disc-shaped recording medium having high reliability and high efficiency.

21 Claims, 9 Drawing Sheets

| BYTE 0 | DISC STRUCTURE TABLE DISCRIMINATION |
|---|---|
| BYTE 1 | A |
| BYTE 2 | B |
| BYTE 10 | MAKER  C |
| BYTE 10 | START ADDRESS OF SECOND DEFECT AREA |
| BYTE 511 | WRITE STRATEGY 1<br>2<br>3 |

RECORDING MEDIUM, METHOD AND APPARATUS UTILIZING CIRCULAR LOGICAL BLOCK ADDRESS ASSOCIATION

BACKGROUND OF THE INVENTION

1. Field of the Invention

This invention relates to a recording medium for magnetically recording information signals and a recording/reproducing method and apparatus for exchange processing of malfunctioning areas of the recording medium for recording the information signals.

2. Description of the Related Art

In a magnetic recording device, defective sectors are detected at the time of disc shipment or disc formatting and physical block addresses of the defective sectors are removed from the allocation to the physical block addresses by way of performing sector slipping. Also, if there occurred a defective track, the track in its entirety is removed from the allocation to the logical sectors, by way of performing track slipping.

As for the defective sectors removed by the sector slipping and for the defective tracks removed by the track slipping, there are such a system in which the sectors or tracks are simply put out of use to render the capacity available for the user variable, and such a system in which substitution sectors or tracks for the sectors or tracks removed by the slipping are provided outside of the usual user area.

In the former case, the sectors or tracks other than those found to be defective can be used in their entirety for writing user data, thus assuring a high recording medium using efficiency. However, this using manner poses a problem in an exchange recording medium such as a floppy disc, although there is no problem raised in case of a non-exchange medium, such as a hard disc. That is, there are occasions wherein the effective disc capacity is varied from disc to disc, such that there is a possibility that copying of the entire disc contents cannot be made from one disc to another.

In the latter case, since a constant format capacity can be assured at all times, the above-mentioned inconvenience in disc copying is not raised. However, since the substitution sectors or tracks need to be provided outside the user area, part or all of the spare region is not unusable.

Thus, the conventional defect processing method used in the conventional magnetic recording device is founded on the basic principle of not using his spare region.

As for the method of associating the physical block addresses with the logical block addresses, there are such a method of disc surface based association, a method of disc surface based association provided that one of the disc surfaces is processed for association and subsequently the other disc surface is processed for association from the opposite direction, and a method of zone based association using separate zones provided from the outset on the disc surfaces.

As for the method of providing spare sectors in case such are provided as the substitution sectors for sector slipping, there are a variety of methods, such as a method of providing the spare sectors in each track, a method of providing the spare sectors in each zone or a method of providing the spare sectors at a pre-set position on the disc.

The associating method for the logical block addresses and the physical block addresses, including defect management, is associated with a non-exchange type recording medium. That is, in selecting the associating method for the physical block addresses and the logical block addresses or the spare sector position setting method, meritorious characteristics, such as short seek time or high transfer speed, or the non-sophisticated control algorithm, represent the criteria for selection.

Meanwhile, with the defect management system, termed slipping, employed in the conventional magnetic recording de-vice, it is not possible to cope with defects that occurred after start of the use of the disc, although it is possible to evade the initial disc defects from the outset.

Thus, for improving disc reliability, there is used a method of previously attaching redundancy bits for error correction prior to proceeding to data recording. If failure readout occurs, those parameters affecting playback characteristics, such as tracking or equalization, are changed on re-trying.

With the above-described conventional system, success in the next readout is not ensured even if readout has been made successfully on re-trying. Moreover, the fact that readout has been achieved only on re-trial with changed parameters means that the sector in question is hard to read such that the sector in question has been lowered in readout reliability.

Thus, with the conventional system, it has been difficult to assure data reliability in future with respect to defects produced during use or otherwise proceeding with lapse of time.

SUMMARY OF THE INVENTION

It is therefore an object of the present invention to provide a recording medium, recording/reproducing method and recording/reproducing apparatus whereby future data reliability can be assured against defects produced during use or otherwise progressing with lapse of time.

In one aspect, the present invention provides a substantially disc-shaped recording medium for recording information signals along a plurality of substantially concentric recording tracks provided on a first major surface and a second major surface thereof, wherein association of logical block addresses to the recording tracks is made in a sequence in which the logical block addresses proceed, in a recordable information area, with a first recording track at a radially mid portion between an innermost recording track and an outermost recording track on the first major surface as a logical starting point, in an address incrementing direction, towards the outer rim as far as a second recording track, then from a third recording track at a mid portion between an innermost recording track and an outermost recording track on the second major surface towards the inner rim as far as a fourth recording track, then from the next recording track on the outer rim side of the second recording track on the first major surface towards the outer rim, until reaching the outermost recording track on the first major surface, the logical block addresses then proceeding towards the inner rim from the outermost recording track on the second major surface, so as to skip the third recording track and the fourth recording track, until reaching the innermost recording track on the second major surface, the logical block addresses then proceeding from the innermost rim on the first major surface towards the outer rim as far as the recording track directly ahead of the first recording track.

In another aspect, the present invention provides a recording/reproducing apparatus for recording/reproducing information signals for a substantially disc-shaped recording medium for recording information signals along a plurality of substantially concentric recording tracks provided on a first major surface and a second major surface thereof The recording/reproducing apparatus includes information signal readout means for reading out information signals from the recording medium, physical block address detection means for detecting the physical block addresses from information signals read out by the readout means from the recording medium, and table detection means for detecting a table holding the relation of correspondence between logical block addresses and physical block addresses by having reference to the physical block addresses detected by the physical block address detection means. The table is provided in a recording track at a mid portion between the innermost recording track and the outermost recording track on the first major surface and in a recording track at a mid portion between the innermost recording track and the outermost recording track on the second major surface, in a recordable information region of the recording medium. The table states the proceeding sequence of the logical block addresses in which the logical block addresses proceed, in the recordable information area, with a first recording track at a radially mid portion between an innermost recording track and an outermost recording track on the first major surface as a logical starting point, in an address incrementing direction, towards the outer rim as far as a second recording track, then from a third recording track at a mid portion between an innermost recording track and an outermost recording track on the second major surface towards the inner rim as far as a fourth recording track, then from the next recording track on the outer rim side of the second recording track on the first major surface towards the outer rim, until reaching the outermost recording track on the first major surface, the logical block addresses then proceeding towards the inner rim from the outermost recording track on the second major surface, so as to skip the third recording track and the fourth recording track, until reaching the innermost recording track on the second major surface, the logical block addresses then proceeding from the innermost rim on the first major surface towards the outer rim as far as the recording track directly ahead of the first recording track. The recording/reproducing apparatus also includes address converting means for reciprocally converting the physical block addresses and the logical block addresses based on the physical block addresses detected by the physical block address detection means and the table detected by the table detection means.

In a further aspect, the present invention provides a recording/reproducing method for recording/reproducing information signals for a substantially disc-shaped recording medium for recording information signals along a plurality of substantially concentric recording tracks provided on a first major surface and a second major surface thereof The method includes an information signal readout step for reading out information signals from the recording medium, a physical block address detection step for detecting the physical block addresses from information signals read out by the readout step from the recording medium, and a table detection step for detecting a table holding the relation of correspondence between logical block addresses and physical block addresses by having reference to the physical block addresses detected by the physical block address detection step. The table is provided in a recording track at a mid portion between the innermost recording track and the outermost recording track on the first major surface and in a recording track at a mid portion between the innermost recording track and the outermost recording track on the second major surface, in a recordable information region of the recording medium. The table states the proceeding sequence of the logical block addresses in which the logical block addresses proceed, in the recordable information area, with a first recording track at a radially mid portion between an innermost recording track and an outermost recording track on the first major surface as a logical starting point, in an address incrementing direction, towards the outer rim as far as a second recording track, then from a third recording track at a mid portion between an innermost recording track and an outermost recording track on the second major surface towards the inner rim as far as a fourth recording track, then from the next recording track on the outer rim side of the second recording track on the first major surface towards the outer rim, until reaching the outermost recording track on the first major surface, the logical block addresses then proceeding towards the inner rim from the outermost recording track on the second major surface, so as to skip the third recording track and the fourth recording track, until reaching the innermost recording track on the second major surface, the logical block addresses then proceeding from the innermost rim on the first major surface towards the outer rim as far as the recording track directly ahead of the first recording track. The method also includes an address converting step for reciprocally converting the physical block addresses and the logical block addresses based on the physical block addresses detected by the physical block address detection step and the table detected by the table detection step.

In the present recording medium and recording/reproducing apparatus, accessing to the recording medium is on the logical block address basis. The logical block addresses correspond to the physical block addresses from which the defective regions have been removed. The logical block addresses are associated with the physical block addresses in such a sequence in which the logical block addresses are incremented sequentially as far as the second recording track on the outer rim side, beginning from a first recording track at a mid portion of the first major surface. The logical block addresses then are incremented sequentially from a third recording track at a mid portion of the second major surface as far as a fourth recording track on the inner rim side and then are incremented from the next recording track towards the outer rim side of the second recording track on the first major surface to the outer rim. The logical block addresses then are incremented from the recording track on the outer rim of the second major surface to the innermost recording track on the second major surface while skipping the third and fourth recording tracks. Finally, the logical block addresses are incremented from the innermost recording track on the first major surface as far as the recording track lying next to the first recording track towards the inner rim side of the first recording track. There is provided a spare region on the inner rim side of the beginning point which is comprised of a first region for replenishing a defective region and a second region contiguous to the spare region for exchanging with a newly produced defective region. A plurality of defect lists, each having a first table for holding the defective region and a second table for holding the relation of correspondence of exchange between the newly produced defective region and the second region, are provided in a region from the first recording track as far as the second recording track of the logical block addresses, in a region from the third recording track as far as the fourth recording track of the logical block addresses and/or on the inner side of the innermost recording track and on the outer side of the outermost recording track in the information areas on the first and second major surfaces.

In a further aspect, the present invention provides a substantially disc-shaped recording medium for recording information signals along a plurality of substantially concentric recording tracks provided on a first major surface and a second major surface thereof, wherein association of logical block addresses with the recording tracks is made in a sequence in which the logical block addresses proceed, in a recordable information area, with a first recording track at a radially mid portion between an innermost recording track and an outermost recording track on the first major surface as a logical starting point, towards the outer rim, in an address incrementing direction, until reaching the outermost recording track on the first major surface, the logical block addresses then proceeding from the outermost recording track on the second major surface towards the inner rim side, until reaching the innermost recording track on the second major surface, the logical block addresses then proceeding from the innermost rim towards the outer rim of the first major surface.

In a further aspect, the present invention provides a recording/reproducing apparatus for recording/reproducing information signals for a substantially disc-shaped recording medium for recording information signals along a plurality of substantially concentric recording tracks provided on a first major surface and a second major surface thereof The recording/reproducing apparatus includes information signal readout means for reading out information signals from the recording medium, physical block address detection means for detecting the physical block addresses from information signals read out by the readout means from the recording medium, and table detection means for detecting a table holding the relation of correspondence between logical block addresses and physical block addresses by having reference to the physical block addresses detected by the physical block address detection means. The table is provided in a recording track at a mid portion between the innermost recording track and the outermost recording track on the first major surface and in a recording track at a mid portion between the innermost recording track and the outermost recording track on the second major surface, in a recordable information region of the recording medium. The table states the proceeding sequence of the logical block addresses in which the logical block addresses proceed towards an outer rim, in the recordable information area in the recording medium, with the radially mid portion as the logical starting point, in an address incrementing direction, until reaching the outermost recording track on the first major surface, the logical block addresses then proceeding towards the inner rim side from the outermost recording track on the second major surface, until reaching the innermost recording track on the second major surface, the logical block addresses then proceeding from the innermost rim of the first major surface towards the outer rim. The recording/reproducing apparatus includes address converting means for reciprocally converting the physical block addresses and the logical block addresses based on the physical block addresses detected by the physical block address detection means and the table detected by the table detection means.

In yet another aspect, the present invention provides a recording/reproducing method for recording/reproducing information signals for a substantially disc-shaped recording medium for recording information signals along a plurality of substantially concentric recording tracks provided on a first major surface and a second major surface thereof. The method includes an information signal readout step for reading out information signals from the recording medium, a physical block address detection step for detecting the physical block addresses from information signals read out by the readout step from the recording medium;

a table detection step for detecting a table holding the relation of correspondence between logical block addresses and physical block addresses by having reference to the physical block addresses detected by the physical block address detection step, the table being provided in a recording track at a mid portion between the innermost recording track and the outermost recording track on the first major surface and in a recording track at a mid portion between the innermost recording track and the outermost recording track on the second major surface, in a recordable information region of the recording medium, and states the proceeding sequence of the logical block addresses in which the logical block addresses proceed towards an outer rim, in the recordable information area in the recording medium, in an address incrementing direction, with the radially mid portion as the logical starting point, until reaching the outermost recording track on the first major surface, the logical block addresses then proceeding towards the inner rim side from the outermost recording track on the second major surface, until reaching the innermost recording track on the second major surface, the logical block addresses then proceeding from the innermost rim of the first major surface towards the outer rim. The method also includes an address converting step for reciprocally converting the physical block addresses and the logical block addresses based on the physical block addresses detected by the physical block address detection step and the table detected by the table detection step.

In the present recording medium and the recording/reproducing method and apparatus, accessing to the recording medium is on the logical block address basis. The logical block addresses correspond to the physical block addresses from which the defective regions have been removed. The logical block addresses are associated with the physical block addresses in such a sequence that the logical block addresses are incremented sequentially towards the outer rim side, beginning from a mid portion of the first major surface, in an information area for recording the information signals of the recording medium. The logical block addresses are incremented from the outer rim of the second major surface to the inner rim and ultimately to the inner rim of the first major surface. In continuation to the last one of the logical block addresses, there is provided a spare region for replenishing the defective region and a second region contiguous to the first region for exchanging with the newly produced defective region. A plurality of defect lists, each having a first table for holding the defective region and a second table for holding the relation of correspondence of exchange between the newly produced defective region and the second region, are provided in a region on the inner rim side of the beginning point of the logical block addresses and/or on the inner side of the innermost recording track and on the outer side of the outermost recording track in the information area on the first and second major surfaces.

In the recording medium and in the recording/reproducing method and apparatus of the present invention, the defect lists are provided on the upper and lower disc surfaces, so that, if one of the lists is not readable, the other can be read out instantaneously. Moreover, since the defect lists are provided at mid portions between the inner most and outermost rims on the upper and lower disc surfaces in a distributed fashion, the list contents can be held in safety against the risk of possible disc contaminations.

In the present recording medium and in the recording/reproducing method and apparatus, since the defect lists for recording defective regions of the disc are provided on the inner and outer rims of the disc, accessing may be had easily from the heads facing the inner and outer rims of the disc.

Moreover, the defect lists are provided on the upper and lower sides on the innermost and outermost rims of the disc, so that, if one of the lists is unreadable, the other can be read instantaneously. Also, the defect lists are provided at mid portions on the innermost and outermost rims of the disc, and hence are not susceptible to dust or dirt, so that defects are less liable to be produced. The logical block addresses of the disc are allocated to proceed from the lower disc surface to the upper disc surface and from the upper surface again to the lower disc surface, in the incrementing order of the logical addresses, there is no fear of loss of continuity of the physical block addresses even if defect tables are provided at the mid portions between the innermost and outermost rims on the lower disc surface.

BRIEF DESCRIPTION OF THE DRAWINGS

FIG. 5 shows a disc structure table.

DESCRIPTION OF THE PREFERRED EMBODIMENTS

Figure 1:
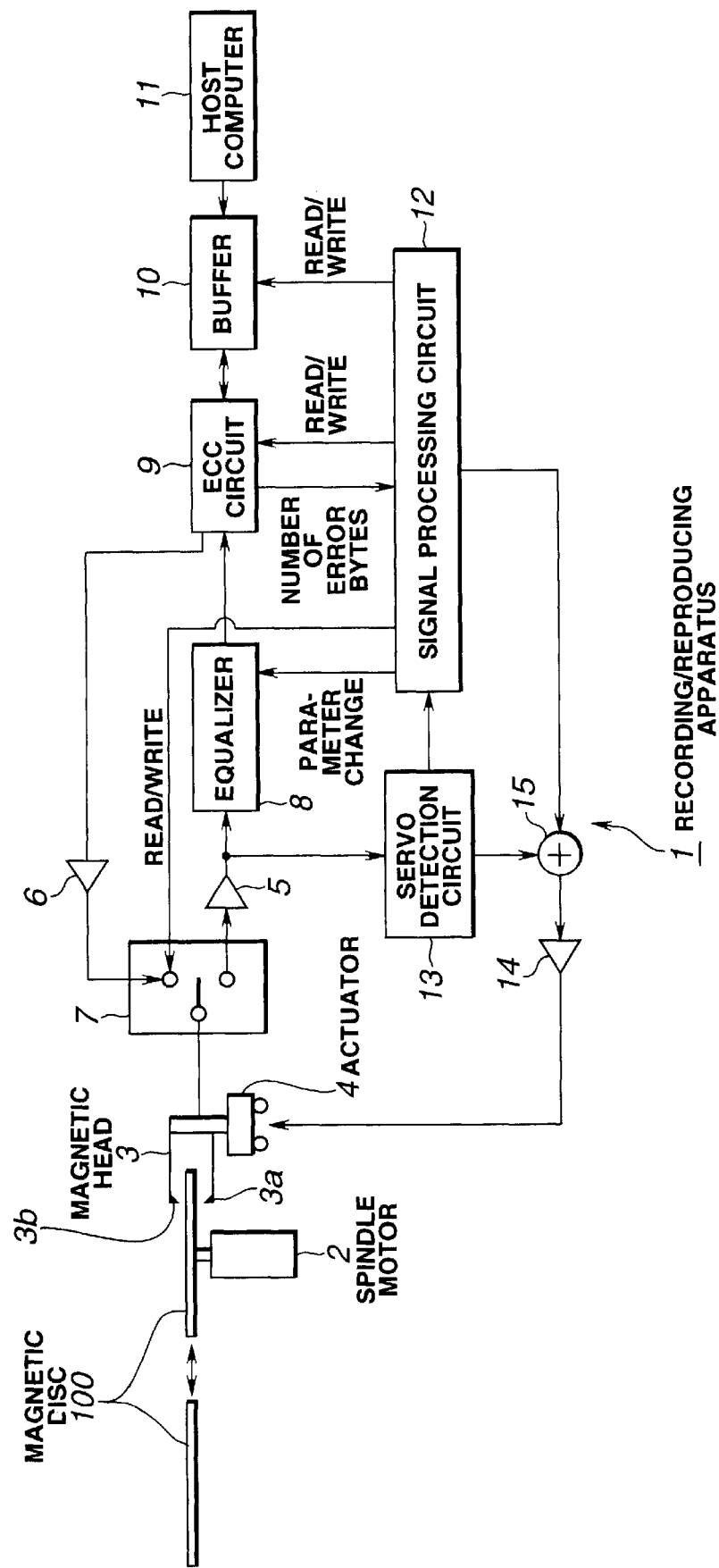
FIG. 1 is a schematic block diagram showing the overall structure of a recording/reproducing apparatus embodying the present invention.

Referring to the drawings, preferred embodiments of the present invention will be explained in detail. As a first embodiment of the present invention, a recording/reproducing apparatus for recording/reproducing information signals for a recording medium is first explained. This first embodiment is directed to a substantially disc-shaped recording medium for recording information signals along a plurality of substantially concentric recording tracks provided on a first major surface and a second major surface thereof, wherein association of logical block addresses with the recording tracks is made in such a sequence that the logical block addresses proceed, in a recordable information area, with a first recording track at a radially mid portion between an innermost recording track and an outermost recording track on the first major surface as a logical starting point, in an address incrementing direction, towards the outer rim as far as a second recording track, then from a third recording track at a mid portion between an innermost recording track and an outermost recording track on the second major surface towards the inner rim as far as a fourth recording track, then from the next recording track on the outer rim side of the second recording track on the first major surface towards the outer rim, until reaching the outermost recording track on the first major surface, the logical block addresses then proceeding towards the inner rim from the outermost recording track on the second major surface, so as to skip the third recording track and the fourth recording track, until reaching the innermost recording track on the second major surface, the logical block addresses then proceeding from the innermost rim on the first major surface towards the outer rim as far as the recording track directly ahead of the first recording track. The first embodiment is also directed to a recording/reproducing method and apparatus employing this recording medium.

In the first embodiment, shown in FIG. 1, a recording/reproducing apparatus 1 includes, as component parts for reading out information signals, that is data, from the disc responsive to logical block addresses sent from a host computer 11, an actuator 4 for driving a pair of magnetic heads 3a, 3b, arranged facing an upper surface of the disc 100 as its first major surface and a lower surface of the disc 100 as its second major surface, an equalizer 8 for adjusting signals, an ECC circuit 9 for correcting errors and a signal processing circuit 12 for converting the physical blocks and logical blocks of the disc 100.

More specifically, the recording/reproducing apparatus 1 includes a spindle motor 2 for rotationally driving the detachable disc 100, the magnetic heads 3a, 3b for reading out data recorded on the signal recording surface of the disc 100, the actuator 4 for causing movement of the magnetic heads 3a, 3b, a signal amplification circuit 5 for amplifying information signals sent from the ECC circuit 9 for writing on the disc 100, and a switch 7 for switching between the signal amplification circuit 5 for amplifying information signals read out from the magnetic heads 3a, 3b and a signal amplification circuit 6 for amplifying information signals sent from the ECC circuit 9 for writing the information signals on the disc 100. The recording/reproducing apparatus 1 also includes the equalizer 8 for adjusting signal characteristics of data amplified by the signal amplification circuit 5, the ECC circuit 9 for attaching the error correction code to data the signal characteristics of which have been adjusted by the equalizer 8, a buffer 10 for transiently storing data outputted by the ECC circuit 9 or data from the host computer 11, and a servo detection circuit 13 for detecting tracking error signals etc from data outputted by the signal amplification circuit 5 based on the servo information and for outputting the servo information to the signal processing circuit 12. The recording/reproducing apparatus 1 ether includes a mixing circuit 15 for outputting the tracking error signals and track seek signals from the signal processing circuit 12 via a signal amplification circuit 14 to the actuator 4.

Meanwhile, the signal processing circuit 12 is constituted by, for example, a DSP circuit. The signal processing circuit 12 has, in addition to the evaluation value acquisition circuit and the function of performing signal recording area exchanging processing, the function of controlling the respective circuits until readout of data from the signal recording area of the disc 100, such as sectors, in order to execute the readout operation. For example, the signal processing circuit 12 controls the switch 7, ECC circuit 9 or the buffer 10 by a read or write command. The magnetic heads 3a, 3b are arranged facing each other with the disc 100 in-between.

Figure 2:
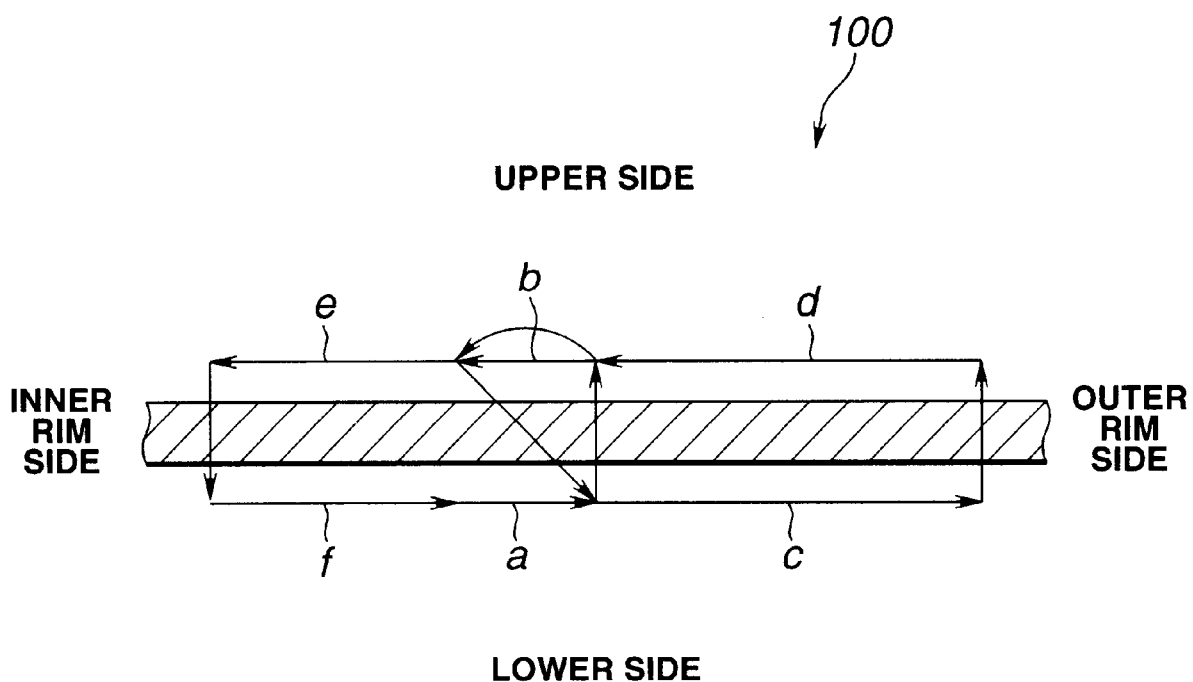
FIG. 2 is a cross-sectional view showing the right half portion of a recording medium according to a first embodiment of the present invention.

Referring to FIG. 2, the recording/reproducing apparatus uses, as a recording medium, the disc 100 having a disc substrate the upper and lower surfaces of which have been coated substantially uniformly with a magnetic material and are provided with plural concentric recording tracks along which information signals are recorded by residual magnetism of the magnetic material. It is for this disc 100 that data is recorded or reproduced.

Referring to FIG. 2, the disc 100 has plural concentric recording tracks on its upper surface as the first major surface and on its lower surface as the second major surface. Among these recording tracks, there are those of the information area in which can be recorded the information signals.

To respective sectors of the recording track are allocated physical addresses in accordance with the following sequence. That is, referring to FIG. 2, the physical addresses proceed sequentially through the recordable information area of the disc 100 for information signals towards the outer rim as far as the second recording track, with the first recording track at a mid portion between recording tracks of the inner and outer rim as the logical starting point, indicated by a path a. The physical addresses then proceed towards the inner rim from the third recording track at a mid portion between the innermost and outermost rims on the upper disc surface as far as the fourth recording track as indicated by a path b. The addresses then proceed from the track next to the second recording track on the lower disc surface towards the outer rim towards the outer rim, as indicated by a path c. On reaching the recording track on the outer rim on the lower disc surface, the addresses proceed from the outermost recording track on the upper disc surface towards the inner rim, skipping the third and fourth recording tracks. That is, the addresses proceed to a tack directly ahead of the third track as indicated by a path d and then from a track next to the fourth track as indicated by a path e. On reaching the innermost recording track on the lower disc surface, the addresses proceed from the innermost recording track on the lower disc surface towards the outer rim as far as a recording track directly ahead of the first recording track, as indicated by a path f.

In associating the physical block addresses and the logical block addresses in the present disc 100, defect lists on defective regions to be evaded or replaced are provided in a region from the first recording track to the second track number on the lower disc surface, representing the first allocation of the logical addresses, as indicated by the route a, and in a region from the third recording track to the fourth recording track on the upper disc surface.

That is, the defect lists are provided in redundancy on the upper and lower surfaces of the disc 100. Specifically, the defect lists are recorded distributed on mid portions of the radially innermost and outermost recording tracks of the information area of the disc 100. By recording the defect lists in this manner in a distributed fashion, the defect lists can be held more reliably on occurrence of contaminations of the disc 100. Specifically, 17 defect lists, for example, are written for safety sake on the disc 100.

The portion of the above-described recording/reproducing apparatus 1, including the signal amplification circuit 5, servo detection circuit 13 and the signal processing circuit 12 serves simultaneously as physical block address detection means for detecting the physical block addresses as physical addresses of the disc 100 and as table detection means for detecting a defect table as a table for holding the relation of correspondence between the physical block addresses and the logical block addresses provided at preset positions of the disc by having reference to the detected physical block addresses.

Based on the defect lists provided at the pre-set positions of the disc 100, the signal processing circuit 12 constitutes block address conversion means for associating the logical block addresses with the physical block addresses. From the host computer 11, addresses are specified by the logical block addresses, which are converted by the signal processing circuit 12 into physical block addresses. Responsive to these physical block addresses, the actuator 4 is driven for driving the magnetic heads 3a, 3b.

The above-described recording/reproducing apparatus 1 is able to acquire the evaluation values concerning the readout operation until signal readout means reads out the data recorded on the disc 100 under control by the signal processing circuit 12 to write in other signal recording areas the data of the signal recording area in which the acquired evaluation value has reached a pre-set value.

The sequence of operations when the recording/reproducing apparatus 1 reads out data recorded on the disc 100 is hereinafter explained.

The recording/reproducing apparatus 1 reads out by the magnetic heads 3a, 3b the data recorded on the disc 100 run in rotation by the spindle motor 2. The data read by the magnetic heads 3a, 3b is entered to the signal amplification circuit 5 via switch 7 controlled by a read command from the signal processing circuit 12.

The input signal to the signal amplification circuit 5 is thereby amplified so that its main data is entered via equalizer 8 to the ECC circuit 9 while its servo information is entered to the servo detection circuit 13.

The ECC circuit 9 performs the processing concerning the error correction code on the data read out from the disc 100. If the ECC circuit 9 detects error bytes in the main data entered via equalizer 8, it reports the number of error bytes to the signal processing circuit 12.

Responsive to the number of the error bytes, the signal processing circuit 12 changes the parameters of the equalizer 8 by way of an operation influencing data playback characteristics.

If the servo detection circuit 13 detects error signals from the input servo information, it advises the signal processing circuit 12 of that effect. Based on the error signals, the signal processing circuit 12 outputs tracking signals to the actuator 4 for shifting the tracking as an operation of influencing the data playback characteristics.

After doing the processing associated with the error signals as described above, the signal processing circuit 12 performs the readout operation. If the data has been read out by the readout operation, the signal processing circuit 12 causes the read-out data to be stored in the buffer 10, while verifying whether or not an error count value is larger than a threshold value E0. This threshold value is determined with the data readout reliability as a quantitative reference.

If the error counter value is larger than the threshold value E0, that is if data readout reliability has been lowered, the signal processing circuit 12 causes the data, once stored in the buffer 10, to be written in the spare region provided on the disc 100. This spare region, which will be explained subsequently, is an exchange sector provided from the outset as a normal sector.

This is a defect management system, termed sector replacement, which quantifies the degree of readout difficulty and recedes the data to the exchange sector depending on the quantified value.

Specifically, the signal processing circuit 12 causes the data, once stored in the buffer 10, to be written via ECC circuit 9 and signal amplification circuit 6 in the spare region of the disc 100. The signal processing circuit 12 updates the sector map in the defect list so that no data will be written in the signal recording area, such as sectors, for which data readout reliability is lacking.

When the recording/reproducing apparatus 1 reading out data detects the number of error bytes or tracking errors, it performs the above-described processing. For example, the recording/reproducing apparatus 1 proceeds to read out data as described above immediately after recording on the disc 100.

Thus, based on the readout retry and error correction code appending operation, the recording/reproducing apparatus 1 rewrites data in other signal recording areas to assure reliability for subsequent data read-out operations.

Thus, the recording/reproducing apparatus 1 is able to prohibit future data readout impossibilities. For example, it is possible to reduce the frequency of occurrences of fatal defects, such as data readout impossibilities, due to dust, defects or contaminations, thereby to prevent future data readout impossibilities.

Figure 3:
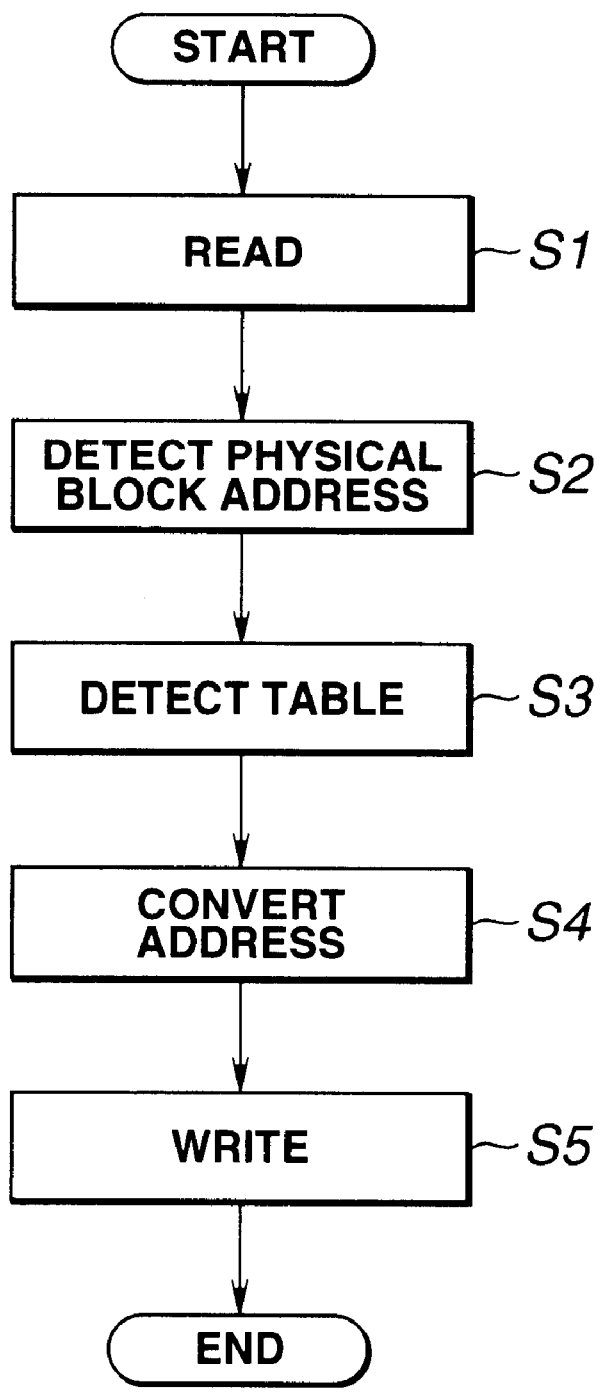
FIG. 3 is a flowchart for illustrating a sequence of steps of the recording/reproducing method.

The sequence of operations of the recording/reproducing method is hereinafter explained with reference to the flow-chart of FIG. 3.

In this recording/reproducing method, shown in FIG. 2, such a disc is used as a recording medium in which a magnetic material is deposited substantially uniformly on substantially the entire upper and lower surfaces of the disc substrate and information signals are recorded by residual magnetism of the magnetic material along the plural concentric recording tracks provided on these upper and lower surfaces. It is for this disc that data is recorded or reproduced.

At a first step S1, information signals are read out from the recording medium. That is, data recorded as residual magnetism on the recording tracks of the recording medium are read out by a magnetic head. At the next step S2, physical block addresses are read out from the information signals read out from the recording medium. The physical block addresses are detected by applying pre-set signal processing on the data read out from the recording medium.

In the above recording medium, that is disc, the logical block addresses proceed in the information area for recording information signals on the disc, as indicated by the paths a to f in FIG. 2. Specifically, the logical block addresses are associated with the physical block addresses in such a sequence that the logical block addresses proceed in the address incrementing order as far as the second recording track towards the outer rim side with the first recording track in a mid portion on the lower disc surface as a logical starting point. The logical block addresses then proceed from the third recording track at a mid portion on the upper disc surface as far as the fourth recording track on the inner rim side and then proceed from a recording track next to the second recording track on the lower disc surface as far as the outer rim. The logical block addresses then proceed from the outermost recording track on the upper disc surface as far as the innermost recording track, skipping the third and fourth recording tracks. Finally, the logical block addresses proceed from the innermost recording track on the innermost rim as far as a recording track directly ahead of the first recording track towards the inner rim.

In associating the physical block addresses and the logical block addresses, defect lists on defective areas to be evaded or replaced are provided in a region from the first recording track to the second track number on the lower disc surface, representing the first allocation of the logical addresses, and in a region from the third recording track to the fourth recording track on the upper disc surface.

At a step S3, next following the step S2, reference is had to the physical block addresses detected at step S2 to detect the defect lists as tables for holding the relation of correspondence between the logical block addresses and the physical block addresses.

At a step S4, next following the step S3, the physical block addresses and the logical block addresses are reciprocally converted, based on the physical block addresses detected at step S2 and on above table detected at step S3.

At the next step S5, given data are written in an address specified by the external host computer as the logical block addresses. This sequence of operations now comes to a close.

A recording medium, which is a disc for magnetically recording data on a signal recording surface for information signals, is hereinafter explained.

Figure 4:
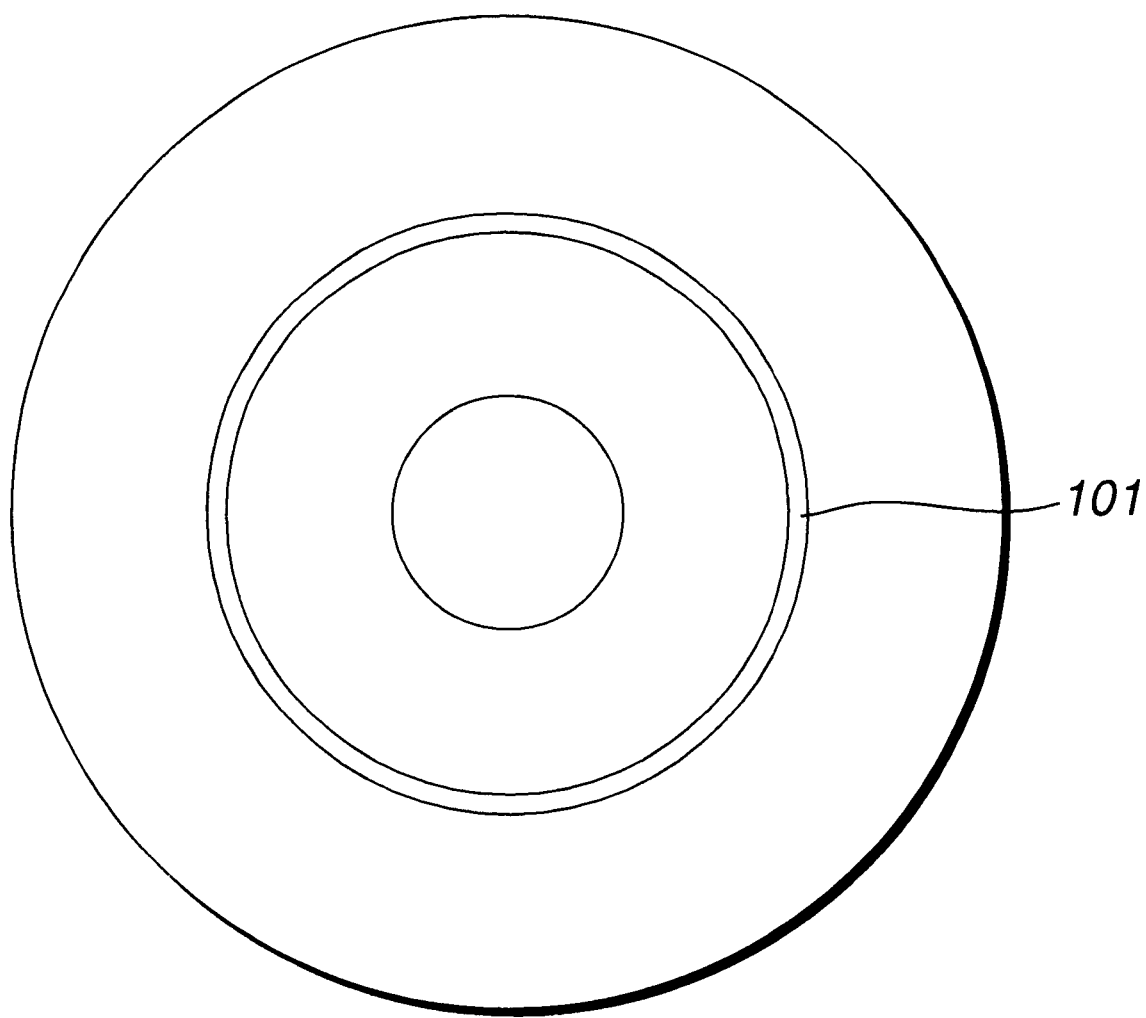
FIG. 4 is a plan view showing a recording medium according to a first embodiment of the present invention.

This disc has its upper and lower major surfaces coated substantially uniformly with a magnetic material, as shown in FIG. 2 showing the right half cross-section and in FIG. 4 showing upper and lower surfaces of the disc 100. On these upper and lower surfaces, there are formed recording tracks substantially concentrically. The portions of the disc provided with these recording tracks constitutes a signal recording surface on which to record information signals. The information signals are recorded along the recording tracks as residual magnetism in the magnetic material. In the disc 100 of FIG. 4, radially mid portions between its outer and inner rims are occupied by defect lists 101.

The recording track is divided into sectors as recording units for information signals. To these sectors, there are accorded physical block addresses representing a pre-set sequence which is based on the actual physical arrangement of the respective sectors. By these physical block addresses, the addresses on the recording track of the information recording surface are determined uniquely.

There are occasions wherein the host computer specifies the disc addresses by the logical block addresses which are logical addresses accorded to the effective sectors. The logical addresses are sequentially accorded addresses for effective sectors, with the exclusion of sectors or track unusable due to defects etc.

For identifying the physical address by a host logical address accorded by the host computer, it is necessary to establish the relation of correspondence between the logical block addresses and the physical block addresses. If the (n−1)st sector of the physical block address is associated with the mth sector of the logical block address, and the nth sector of the physical block address is unusable, one sector is skipped in the physical block address so that the (m+1)st sector of the logical block address is associated with the (n+1)st sector in the physical block address.

The relation of correspondence between the logical block addresses and the physical block addresses is provided in the sequence proceeding from the path a to the path f in the information area provided with the recording track of the disc, as shown in FIG. 2 showing the right half portion of the cross-section of the disc.

In the information area of the disc 100, in which can be recorded the information signals, the logical addresses proceed to the second recording track from a logical start point at a first recording track at a radially mid portion between the innermost recording track and the outermost recording track on the lower disc surface, as indicated by the path a. The logical addresses proceed from the third recording track at a radially mid portion between the innermost recording track and the outermost recording track on the upper disc surface towards the inner rim to the fourth recording track, as indicated by a path b. Then, the logical addresses proceed from the recording track next following the second recording track on the lower disc surface towards the outer rim, as indicated by the path c. On reaching the outermost recording track on the lower disc surface, the logical addresses proceed from the outermost recording track on the upper disc surface towards the inner rim, skipping the above-mentioned third and fourth recording tracks. On reaching the innermost recording track on the upper disc surface, the logical addresses proceed from the innermost recording track on the lower disc surface as far as the recording track directly previous to the above-mentioned first recording track, as indicated by a path f.

The relation of correspondence between the logical block addresses and the physical block addresses is set in the above sequence so that the leading end of the logical block addresses is at the mid portion on the lower disc surface and a spare sector area for initial defect followed by an exchange sector area for sector replacement is set in continuation to the last address of the logical block addresses.

On the inner rim side of the logical starting point on the lower disc surface, there is provided a spare sector as a spare region in continuation to the terminal point of the logical block addresses. That is, the spare region on the disc is provided on the inner rim side of the logical starting point at a mid portion on the lower disc surface corresponding to the end of the relation of correspondence between the logical block addresses and the physical block addresses.

The spare region has, in terms of the physical block addresses of the recording track and the logical block addresses excluding the unusable defective region from the physical block addresses, in the sequence of association with the logical block addresses, a first region used for supplementing a defective region excluded by the logical block addresses and a second region for exchanging the defective region generated with the use of the disc. These first and second regions are used by a slipping list and an exchange list as now explained.

The defect list region includes a slipping list as a first table for holding the relation of correspondence between the physical block addresses and the logical block addresses. In this slipping list, there is recorded the position of the defect region, such as the defective sector, usually at the time of shipment from the factory, in order to slip, that is skip, the defective region.

Also, a table of correspondence between the defective sector table for slipping and a table of correspondence between the logical block addresses and the physical block addresses for sector replacement are placed directly ahead of the leading end position of the logical block addresses, and/or are placed in a region outside of the relation of correspondence to the logical block addresses further inside or outside the switching position of the physical block addresses from the lower surface to the upper surface or from the upper surface to the lower surface. The same table information is recorded in these regions.

If the defective region is recorded in the slipping list, this defective region is skipped in the relation of correspondence between the physical block addresses and the logical block addresses. Therefore, the logical block addresses proceed in the increasing address direction with respect to the physical block addresses. The region which has become necessary to procure the logical block addresses by this slipping is secured in the spare region.

The defective region has an exchange list, that is an alternation list, which is a second table for holding the relation of correspondence of exchange of the defective region which has been produced with the use of the disc. This exchange list holds address pairs for the defective regions such as defective sectors and exchange regions for these defective regions provided in the spare region.

The slipping list and the exchange list hold the relation of correspondence between the physical block addresses and the logical block addresses, while the control from the host computer is accorded by the logical block addresses and the physical accessing from the head to the disc is specified by the physical block addresses. Therefore, reference needs to be had to these lists when the disc is in use, such as when the disc starts to be used or when the disc is inserted into the recording/reproducing apparatus.

Since the defect lists are recorded distributed at a radially mid portion between the innermost and outermost rims of the information area on the upper disc surface and at a radially mid portion between the innermost and outermost rims of the information area on the lower disc surface, these defect lists are reliably preserved against possible disc contaminations, thus improving the defect list safety.

Since the spare region is provided at a radially mid portion between the innermost and outermost rims of the information area on the lower disc surface, there is scarcely any risk of dust and dirt becoming deposited thereon to produce a defect, thus enabling the crucial information to be held reliably by the spare region or the defect lists. That is, there are scarcely product defects on the lower disc surface due to descent of dust and dirt.

The defect lists can also be recorded on the inner sides of the innermost rims or on the outer sides of the outermost runs of the recording track on the upper and lower disc surfaces. For example, the defect lists 101 may be provided as shown for example in FIG. 7.

If the defect lists are recorded in plural positions on the disc, by recording the defect lists in redundancy in plural positions, the contents of the defect lists, accommodating the crucial information, namely the relation of correspondence between the physical block addresses and the logical block addresses, can be preserved reliably. Thus, even if several defect lists are lost, reference can be had to the remaining defect lists.

If the disc is not in use, the head is locked at a shipping position which is the fixed position on the inner side of the innermost rim or on the outer side of the outermost rim of the disc. If the disc starts to be used, the head lock at the shipping position is released. If the defect lists are provided on the inner side of the innermost rim or on the outer side of the outermost rim of the disc, the head can reach the defect lists from the shipping position in a shorter time when the disc starts to be used.

That is, if the head is locked on the inner side of the innermost rim or on the outer side of the outermost rim of the disc, it is sufficient if the defect lists provided on the inner side of the innermost rim or on the outer side of the outermost rim of the disc are accessed, respectively, thus shortening the access time.

Also, the defect lists are provided at the same position on the upper and lower disc surfaces, so that, if the defect lists cannot be read by one of the magnetic heads 3a, 3b, the defect lists provided on the opposite side surface can be immediately read out by the other of the magnetic beads 3a, 3b without the necessity of causing head movement.

The defect list includes a slipping list as a first table and an exchange list as a second table. If the boundary between these lists is fixed, there is a fear that an unused area be produced. In order to prevent this from occurring, the boundary is rendered variable. That is, the slipping list, set at the time of shipment from the factory, can be rewritten by re-formatting. As for the exchange list, the number of times of exchange tends to be increased with re-formatting. It is therefore convenient if the boundary is rendered variable depending on the respective capacities.

If, for example, the number of unit bytes of slipping lists for recording the addresses of the defective sectors is three bytes, the exchange list records the defective sectors and the addresses of the sectors replacing the defective sectors, so that the number of unit bytes of the slipping lists is six bytes.

If, in this case, the boundary between the slipping list and the exchange list is fixed, and the slipping list is fully charged on the occasion of reformatting, it becomes impossible to shift the registration of the defective sectors from the exchange list to the slipping list. If conversely the boundary between the slipping list and the exchange list is movable, it is possible to cause the movement from the exchange list to the slipping list at all times.

If a defective region is newly produced, it is necessary to update all defect lists on the disc in which to register the defective regions. It is however unnecessary to update the defect lists immediately on occurrence of defective regions since the updating can be performed at a time when disconnecting the power source or when taking out the disc from the device.

A plurality of the defect lists are provided in registration on the upper and lower disc surfaces. If the defect lists are provided in this manner in registration on the upper and lower disc surfaces, access to the lists may be had without the necessity of causing head movement. Moreover, since plural defect lists are provided, the contents of the defect lists can be preserved reliably.

In this disc, there is recorded a table for holding the relation of correspondence between the physical block addresses and the logical block addresses. This table, held by the disc, and holding the above-mentioned relation of correspondence, is made up of a slipping list and an exchange list. The slipping list is used for slipping a defective region, such as the defective sectors/ defective tracks found on initialization at the time of shipment from the factory by recording such defective region. The exchange list, on the other hand, is used for recording a new defective region produced with lapse of time as a pair with another region and substituting the other region for the new defective region.

The region slipping, or so-called slipping, is basically executed at the time of shipment from the factory. In this case, data is recorded on the totality of sectors as a format. The written data then is read out and errors are located. If errors are located, these are registered in the slipping list. The sectors, thus registered, are defective and hence are not used.

The defect list includes a disc structure table DST for holding the information on the disc. This disc structure table is written in a maintenance region in which the defect lists are written. Specifically, with the disc 100 shown for example in FIG. 2, the DST is recorded in a recording track next following the outer rim side of the second recording track on the lower surface of the disc 100 or in a recording track next following the inner rim side of the fourth recording track on the upper surface of the disc 100.

The DST 53 is made up of 512 bytes, as shown in FIG. 5, and records therein the disc manufacturer, disc strategy etc. That is, in the 0th byte, an ID for identifying the DST, such as "FE", is recorded in hexadecimal notation. In the first to tenth bytes, next following the 0th byte, the name of the disc manufacturer is recorded in ASCII notation. From the 200th byte on, the second defective region, that is the start address of the exchange list, is recorded.

In the DST, plural disc strategies are recorded. As the disc strategies, the recording current, converted to an integer number by suitable conversion, is recorded.

In the DST, there may be recorded the information on the disc manufacturer, such as date of manufacture or serial numbers, slipping list start address, recording conditions, reproducing conditions, and the disc format information. The DST may also be used for assuring interchangeability for a high-density large-capacity magnetic recording medium which may be introduced in future. The drive for driving the disc of the recording medium is designed not to accept mediums other than the current first-generation medium (version 1.0).

In addition to the slipping list, the DST is necessarily recorded on a formatted disc. In the defect list, since the boundary between the slipping list as the first defective region and the exchange list as the second defective region is not fixed, the DST needs to be read out for accessing to the exchange list. If no defective region has been produced with use of the disc, such that it is unnecessary to exchange the defective region, a void exchange list is recorded as the defect list.

Figure 6:
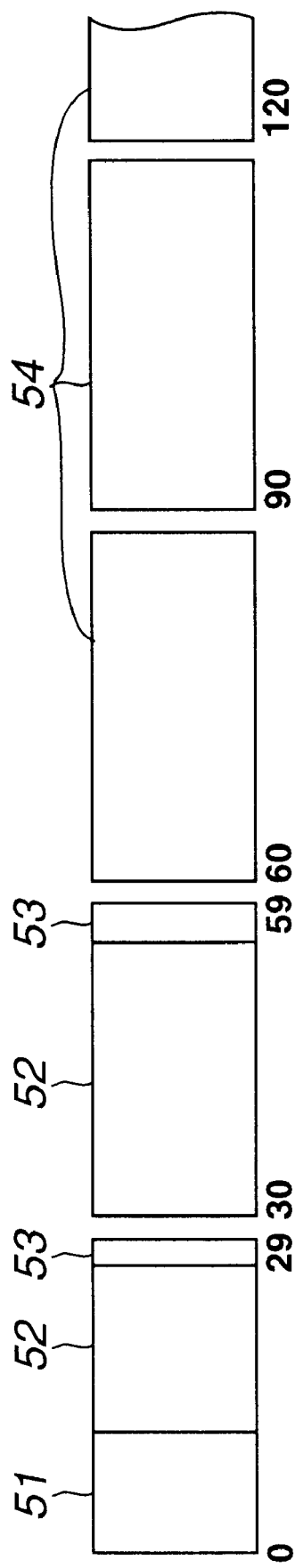
FIG. 6 shows the structure of a physical address block.

An illustrative structure of the defect list is now explained with reference to FIG. 6, in which each block is made up of, for example, 30 sectors.

In the initial block, a slipping list 51 is provided as from the first address of the physical block addresses. Next to the slipping list 51 is assigned an exchange list 52. In the last one sector is recorded a disc structure table 53.

The second block is assigned to the exchange list, except that the disc structure table 53 is recorded in the last block. In the exchange list, there are sequentially recorded address pairs of addresses of new defective regions produced with use of the disc and addresses of spare regions exchanged for the defective regions. The third and the following blocks represent information regions 54 in which to record data. The block capacity and the arrangement of the defect lists are not limited to this illustrative structure.

In the present embodiment, there is provided a spare region for replenishment in readiness for slipping performed at the time of shipment from the factory or exchange of defective regions produced with use of the disc. Thus, a pre-set recording capacity of the disc can be maintained unless the volume of the regions required for slipping or exchange of defective regions exceeds that of the spare region, so that the disc can be used as an exchangeable recording medium.

The difference between the hard disc and the floppy disc in connection with the necessity for exchange of the recording medium is hereinafter explained.

In the following description, it is assumed that the hard disc as a medium is not exchanged. Therefore, if, in a hard disc, the medium is fluctuated in capacity, the initial capacity of 256 Mbytes may be decreased to 248 or 252 Mbytes. This, however, is allowed for the HDD. Therefore, the slipping may be carried out at the outset, or the slipping is not executed, with the defective sectors not being used. By not using the slipping or defective sectors, the disc capacity is occasionally decreased.

Conversely, the floppy disc, which is an exchange medium, cannot be varied in its recording capacity. That is, if the floppy disc capacity is changed, it becomes impossible to execute disc-based disc copying between floppy discs. Thus, the floppy disc capacity needs to be maintained at all times at a constant value. Therefore, the decrease in the disc capacity due to defective sectors needs to be compensated at any rate.

The status of the defective regions, such as distribution, varies from disc to disc, so that, for recording/reproducing the disc by a recording/reproducing apparatus, it is necessary to read out the defect list provided on the disc in order to comprehend the relation of correspondence between the physical block addresses as the physical addresses and the logical block addresses as the logical addresses.

As discussed above, accessing from a host computer in the magnetic recording device is in units termed logical block addresses which are associated with the physical block addresses on the disc based on a certain rule. The processing of detecting physical block addresses defective in connection with association with the logical block addresses to exclude the detected physical block addresses from the relation of correspondence with the logical block addresses is indispensable. Here, the leading end of the logical block addresses is put at mid portions of the upper and lower disc surfaces and, as the address number of the logical block addresses are incremented, the logical block addresses are associated in the above-described sequence with the physical block addresses, while a spare region for sector swaping is set in continuation to the last address of the logical block and an exchange region for sector replacement is set in continuation to the spare region. A table having defective sectors for sector swapping registered therein and a table for associating the logical block addresses for sector swapping and physical block addresses are recorded in the disc. These table are placed ahead of the leading position of the logical block addresses and/or in a region outside the association for the logical block addresses on the further outer or further inner rim side than the switching position between the upper and lower disc surfaces of the physical block addresses allocated to the logical block addresses.

As a second embodiment of the present invention, a recording/reproducing apparatus for recording/reproducing information signals for a recording medium is hereinafter explained. This second embodiment is directed to a substantially disc-shaped recording medium for recording information signals along a plurality of substantially concentric recording tracks provided on a first major surface and a second major surface thereof. The association of logical block addresses to the recording tracks is made in a sequence in which the logical block addresses proceed, in a recordable information area, with a first recording track at a radially mid portion between an innermost recording track and an outermost recording track on the first major surface as a logical starting point, towards the outer rim as far as a second recording track, then from a third recording track at a mid portion between an innermost recording track and an outermost recording track on the second major surface towards the inner rim as far as a fourth recording track, then from the next recording track on the outer rim side of the second recording track on the first major surface towards the outer rim, until reaching the outermost recording track on the first major surface, the logical block addresses then proceeding towards the inner rim from the outermost recording track on the second major surface, skipping the third recording track and the fourth recording track, until reaching the innermost recording track on the second major surface. The logical block addresses then proceed from the innermost rim on the first major surface towards the outer rim until reaching the recording track directly ahead of the first recording track. The present second embodiment is also directed to a recording/reproducing method and apparatus employing this recording medium. For simplicity, the portions or componetns common to those of the first embodiment are depicted by the same reference numerals by referring to the drawings referred to in the first embodiment.

In the second embodiment, the recording/reproducing apparatus 1 includes, as shown in FIG. 1, an actuator 4 for driving the magnetic heads 3a, 3b provided facing the upper and lower surfacers of the disc 100, as components parts for reading out information signals, that is data, from the disc responsive to the logical block addresses sent from the host computer 11, an equalizer 8 for adjusting signals, an ECC circuit 9 for correcting errors anda signal processing circuit 12 for converting the physical blocks and the logical blocks of the disc 100.

More specifically, the recording/reproducing apparatus 1 includes a spindle motor 2 for rotationally driving the detachable disc 100, the magnetic heads 3a, 3b for reading out data recorded on the signal recording surface of the disc 100, the actuator 4 for causing movement of the magnetic heads 3a, 3b, and a switch 7 for switching between a signal amplification circuit 5 for amplifying information signals read out from the magnetic heads 3a, 3b and a signal amplification circuit 6 for amplifying information signals sent from the ECC circuit 9 for writing the information signals on the disc 100. The recording/reproducing apparatus 1 also includes the equalizer 8 for adjusting signal characteristics of data amplified by the signal amplification circuit 5, the ECC circuit 9 for attaching thereto correction code to data the signal characteristics of which have been adjusted by the equalizer 8, a buffer 10 for transiently storing data outputted by the ECC circuit 9 or data from the host computer 11, and a servo detection circuit 13 for detecting tracking error signals etc from data outputted by the signal amplification circuit 5 based on the servo information and for outputting the servo information to the signal processing circuit 12. The recording/reproducing apparatus 1 further includes a mixing circuit 15 for outputting the tracking error signals and track seek signals from the signal processing circuit 12 via a signal amplification circuit 14 to the actuator 4.

Meanwhile, the signal processing circuit 12 is constituted by, for example, a DSP circuit. The signal processing circuit 12 has, in addition to the evaluation value acquisition circuit and the function of processing the signal recording surface exchanging function, the function of controlling the respective circuits until readout of data from the signal recording area of the disc 100, such as sectors, in order to execute the readout operation. For example, the signal processing circuit 12 controls the switch 7, ECC circuit 9 or the buffer 10 by read or write command.

Figure 7:
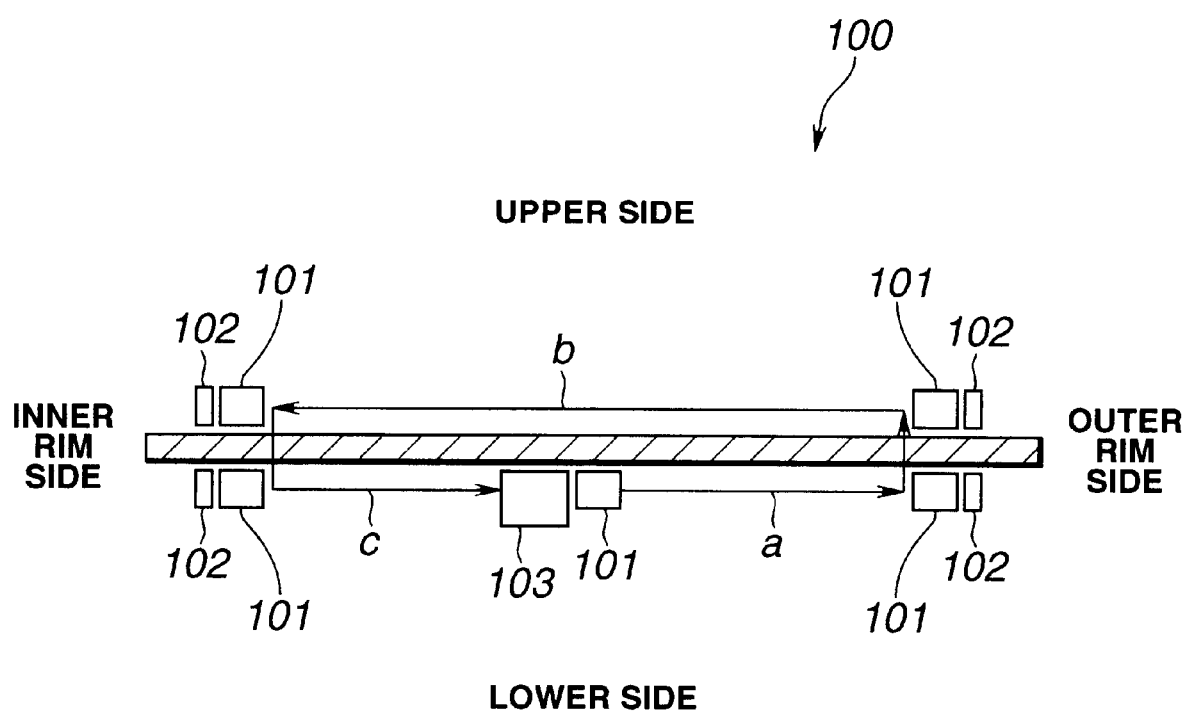
FIG. 7 is a cross-sectional view showing the right half portion of a recording medium according to a second embodiment of the present invention.
Figure 8:
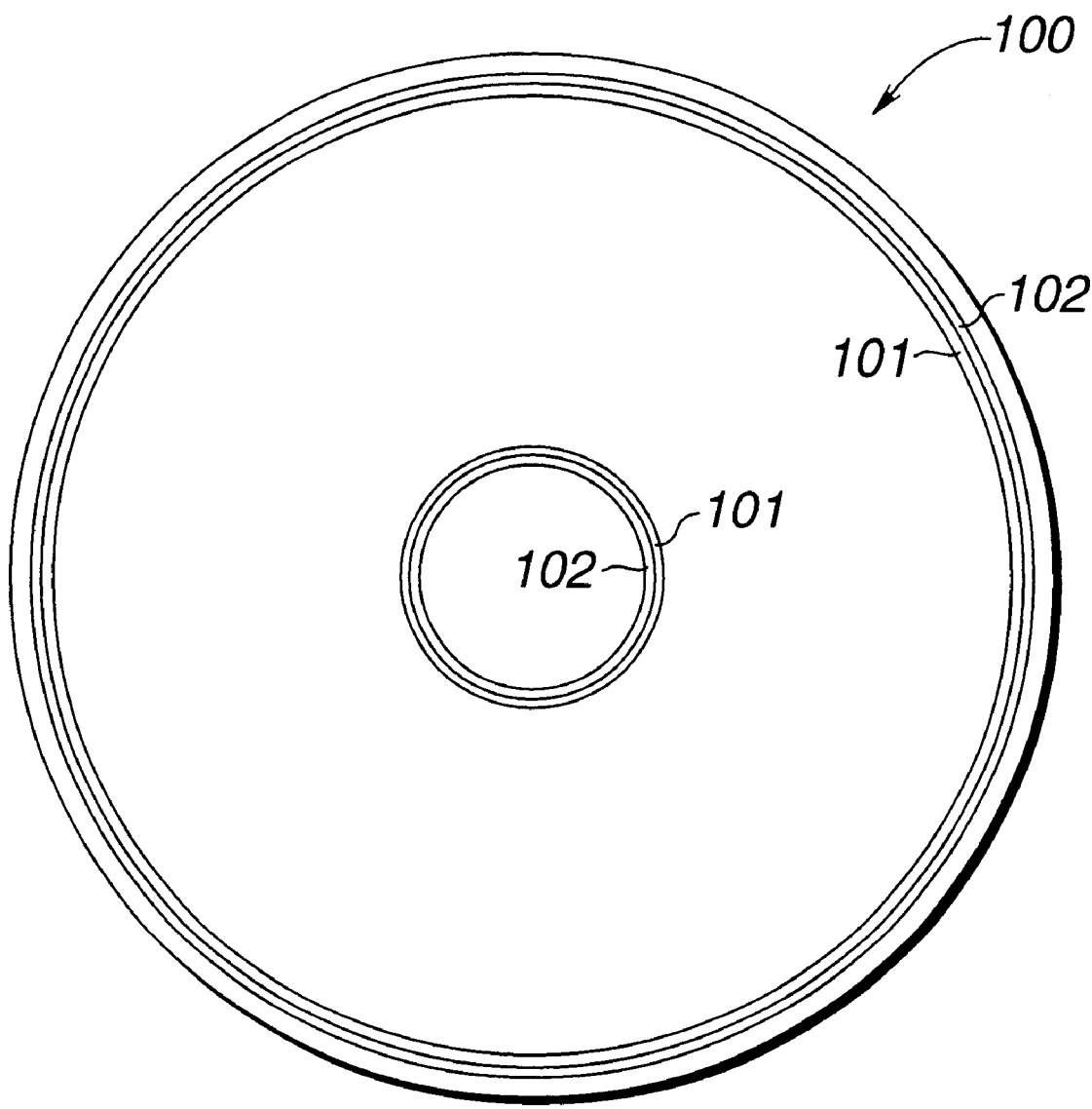
FIG. 8 is a top plan view of a recording medium according to a second embodiment of the present invention.
Figure 9:
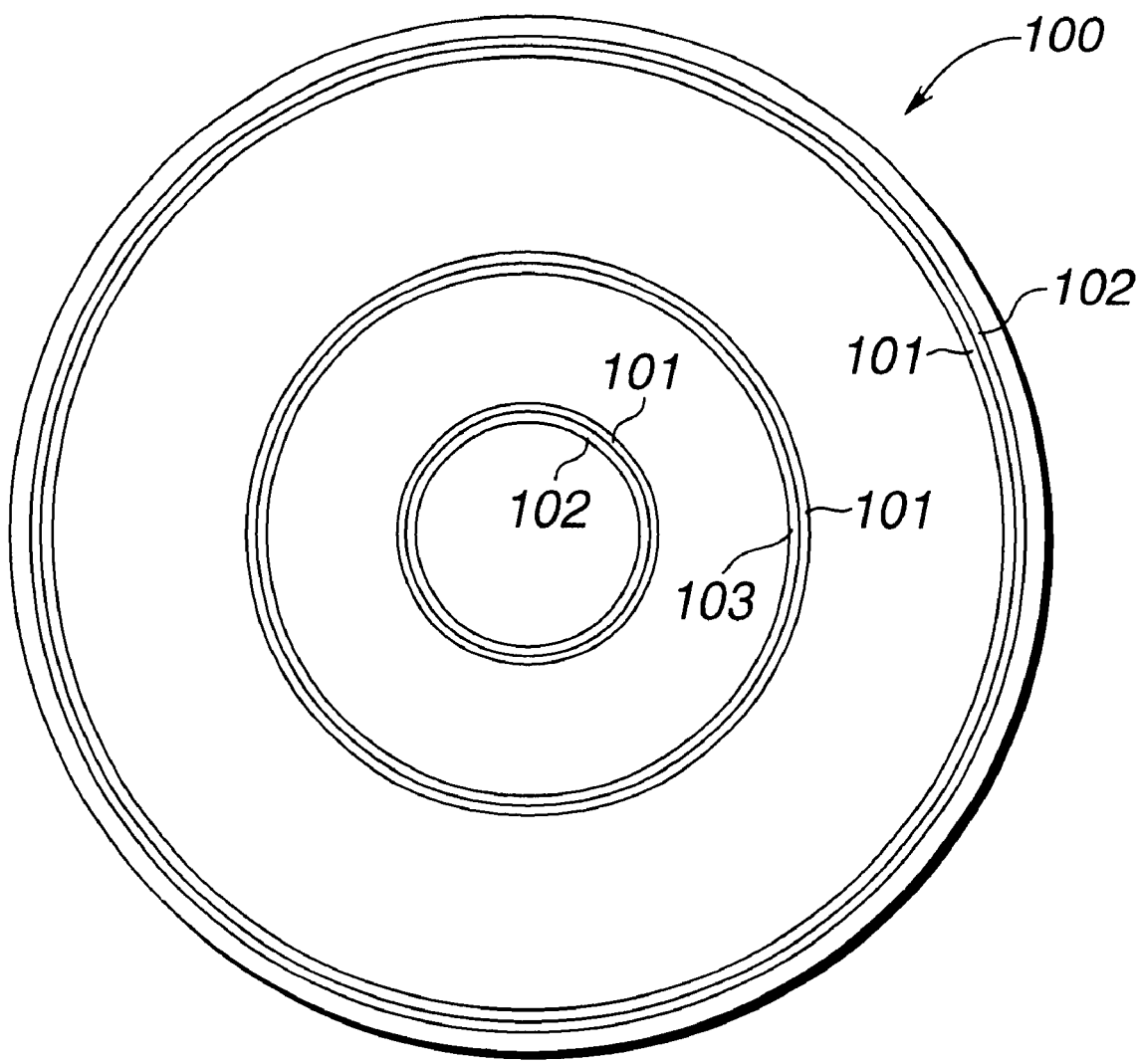
FIG. 9 is a bottom plan view of a recording medium according to a second embodiment of the present invention.

Referring to FIGS. 7, 8 and 9, showing the cross-section of a right-half portion, an upper side and a lower side of the disc, respectively, the recording/reproducing apparatus uses, as a recording medium, the disc 100 having a disc substrate the upper and lower surfaces of which have been coated substantially uniformly with a magnetic material and are provided with plural concentric recording tracks along which information signals are recorded by residual magnetism of the magnetic material. It is for this disc 100 that data is recorded or reproduced. In these drawings, there are shown a defect list 101, a void track 102 and a slipping list 103.

In the present disc 100, the relation of correspondence between the physical block addresses physically associated with the disc is set so that logical addresses proceed from a radially mid portion of an recordable information area of the disc 100 towards the outer rim side, until reaching the outermost recording track on the lower disc surface, then proceed from the outermost recording track on the upper disc surface towards the inner rim side, until reaching the innermost recording track on the upper disc surface, and then proceed from the innermost recording track on the lower disc surface towards the outer rim side, as indicated by routes a, b and c in FIG. 7.

In the above-described association between the physical block addresses and the logical block addresses, the defect lists for the defective regions to be evaded or exchanged are provided on the inner rim side of the logical beginning point on the lower disc surface.

In the above-described recording/reproducing apparatus 1, the signal amplification circuit 5, servo detection circuit 13 and the signal processing circuit 12 serve as physical block address detection means for detecting the physical block addresses as physical addresses of the disc 100 and as table detection means for detecting a defect table provided at a pre-set position of the disc for holding the relation of correspondence between the physical block addresses and the logical block addresses.

Based on the defect lists, provided at a pre-set position of the disc 100, the signal processing circuit 12 constitutes block address conversion means for associating the physical block addresses with the logical block addresses. The host computer 11 specifies the addresses with the logical block addresses, which are converted by the signal processing circuit 12 into physical block addresses. The actuator 4 driving the magnetic heads is actuated responsive to these physical block addresses.

With the above-described recording/reproducing apparatus 1, it is possible to acquire evaluation values on the readout operation performed until signal readout means is able to read out data recorded on the disc 100 under control by the signal processing circuit 12 and to write the data of the signal recording area, the evaluation value for which has reached the pre-set value, in another pre-set signal recording area.

The sequence for the recording/reproducing apparatus 1 to read out data recorded on the disc 100 is now explained.

The recording/reproducing apparatus 1 causes the magnetic heads 3a, 3b to read out data recorded on the disc 10 ran in rotation by the starting material 2. The data read out by the magnetic head 3 is sent to the signal amplification circuit 5 via the switch 7 controlled by a read command from the signal processing circuit 12.

The signals entered to the signal amplification circuit 5 is thereby amplified so that the main data is sent via equalizer 8 to the ECC circuit 9 while the servo information is sent to the servo detection circuit 13.

The ECC circuit 9 performs error correcting processing on the data read out from the disc 100. On detection of an error byte in the main data fed from the equalizer 8, the ECC circuit 9 advises the number of error bytes to the signal processing circuit 12.

The signal processing circuit 12 is responsive to the number of error bytes to modify the parameters of the equalizer 8 by way of an operation for influencing the data playback characteristics.

On detection of error signals from the input servo information, the servo detection circuit 13 advises the signal processing circuit 12 of that effect. The signal processing circuit 12 outputs tracking signals to the actuator 4, based on the error signals, for shifting the tracking as an operation of influencing the data playback characteristics.

After doing the processing associated with the error signals as described above, the signal processing circuit 12 proceeds to a readout operation. If data has been read out by the readout operation, the signal processing circuit 12 causes the read-out data to be stored in the buffer 10, while verifying whether the error count value is larger than the threshold value E0. The threshold value E0 is pre-set with data readout reliability, for example, as a quantitative reference.

If the error count value is larger than the threshold value E0, that is if data readout reliability is verified to be lowered, the signal processing circuit 12 causes data transiently recorded in the buffer 10 to be written in the spare region provided on the disc 100. This spare region, which will be explained subsequently, is an exchange sector provided from the outset as a regular sector.

This is a defect management system, termed sector replacement, which quantifies the degree of readout difficulty and recedes the data to the exchange sector depending on the quantified value.

Specifically, the signal processing circuit 12 causes the data, once stored in the buffer 10, to be written via ECC circuit 9 and signal amplification circuit 6 in the spare region of the disc 100. The signal processing circuit 12 updates the sector map in the defect list so that no data will be written in the signal recording area, such as sectors, for which data readout reliability is lacking.

On reading out data to detect the number of error bytes or the tracking error, the recording/reproducing apparatus 1 performs the above-described processing. For example, the recording/reproducing apparatus 1 proceeds to the above-described data readout processing immediately after recording on the disc 100.

Thus, based on the readout retry and error correction code appending operation, the recording/reproducing apparatus 1 rewrites data in other signal recording areas to assure reliability for subsequent data read-out operations.

Thus, the recording/reproducing apparatus 1 is able to prohibit future data readout impossibilities. For example, it is possible to reduce the frequency of occurrences of fatal defects, such as data readout impossibilities, due to dust, defects or contaminations, that occurred during use, thereby to prevent future data readout impossibilities.

The sequence of operations of the recording/reproducing method is hereinafter explained with reference to the flow-chart of FIG. 3.

In this recording/reproducing method, such a disc is used as a recording medium in which a magnetic material is deposited substantially uniformly on substantially the entire upper and lower surfaces of the disc substrate and information signals are recorded by residual magnetism of the magnetic material along the plural concentric recording tracks provided on these upper and lower surfaces, as shown in FIG. 7. It is for this disc that data is recorded or reproduced.

At a first step S1, information signals are read out from the recording medium. That is, data recorded as residual magnetism on the recording tracks of the recording medium are read out by a magnetic head. At the next step S2, physical block addresses are read out from the information signals read out from the recording medium. The physical block addresses are detected by applying pre-set signal processing on the data read out from the recording medium at step S1.

In the present disc 100, the relation of correspondence between the physical block addresses physically associated with the disc is set so that logical addresses proceed from a radially mid portion of an recordable information area of the disc 100 towards the outer rim side, until reaching the outermost recording track on the lower disc surface, then proceed from the outermost recording track on the upper disc surface towards the inner rim side, until reaching the innermost recording track on the upper disc surface, and then proceed from the innermost recording track on the lower disc surface towards the outer rim side, as indicated by routes a, b and c in FIG. 7.

In the above-described association between the physical block addresses and the logical block addresses, the defect lists for the defective regions to be evaded or exchanged are provided on the inner rim side of the logical beginning point on the lower disc surface.

At a step S3, next following the step S2, reference is had to the physical block addresses detected at step S2 to detect the defect lists as tables for holding the relation of correspondence between the logical block addresses and the physical block addresses.

At the step S4, next following the step S3, the physical block addresses and the logical block addresses are converted reciprocally based on the physical block addresses detected at step S2 and on the above table detected at step S3.

At the next step S5, given data are written in an address specified as the logical block addresses by the external host computer. This terminates the series of processing operations.

A recording medium, which is a disc for magnetically recording data on a signal recording surface for information signals, is hereinafter explained.

This disc has its upper and lower major surfaces coated substantially uniformly with a magnetic material, as shown in FIG. 2 showing the right half cross-section and in FIG. 4 showing upper and lower surfaces of the disc 100. On these upper and lower surfaces, there are formed recording tracks substantially concentrically. The portions of the disc provided with these recording tracks constitute a signal recording surface on which to record information signals. The information signals are recorded along the recording tracks as residual magnetism in the magnetic material. In the disc 100 of FIG. 4, radially mod portions between its outer and inner rims are occupied by defect lists 101.

The recording track is divided into sectors as recording units for information signals. To these sectors, there are accorded physical block addresses representing a pre-set sequence which is based on the actual physical arrangement of the respective sectors. By these physical block addresses, the addresses on the recording track of the information recording surface are determined uniquely.

There are occasions wherein the host computer specifies the disc addresses by the logical block addresses which are logical addresses accorded to the effective sectors. The logical addresses are sequentially accorded addresses for effective sectors, with the exclusion of sectors or track unusable due to defects etc.

For identifying the physical address by a host logical address accorded by the host computer, it is necessary to establish the relation of correspondence between the logical block addresses and the physical block addresses. If the (n−1)st sector of the physical block address is associated with the mth sector of the logical block address, and the nth sector of the physical block address is unusable, one sector is skipped in the physical block address so that the (m+1)st sector of the logical block address is associated with the (n+1)st sector in the physical block address.

The relation of correspondence between the logical block addresses and the physical block addresses is by so-called circular mapping in which addresses circulate through the information area of the disc provided with the recording tracks beginning from the lower disc surface as indicated in a right half cross-sectional portion of the disc, as shown in FIG. 7.

Specifically, the logical block addresses are incremented towards the outer rim side, beginning from a radially mid recording track between the innermost recording track and the outermost recording track of the recordable information area on the lower disc surface, as indicated by a path a in FIG. 7. On reaching the innermost recording track of the information area on the upper disc surface, the logical block addresses are incremented from the recording track towards the inner rim side in the information area on the upper disc surface, as indicated by the path b. On reaching the innermost recording track of the information area on the upper disc surface, the logical block addresses are incremented from the innermost rim towards the outer rim in the information area on the lower disc surface.

The logical block addresses are associated with the physical block addresses in such a manner that the leading end of the logical block addresses is put at a radially mid portion on the lower disc surface, the logical block addresses proceed towards the outer rim on the lower disc surface in the order of the increasing address values to proceed from the outer rim of the disc on the upper disc surface as far as the inner rim on the upper disc surface and from the inner rim of the lower disc surface to the radially mid portion on the lower disc surface. Next to the last address of the logical block addresses is put a spare spare region for initial defect followed by an exchange spare region for sector replacement.

On the inner rim side of the logical beginning point of the lower disc surface, there is provided a spare sector, as a spare region, in continuation to the terminal point of the logical block addresses.

In connection with the physical block addresses of the recording track and with the logical block addresses corresponding to the physical block addresses less the unusable defective regions, the spare region has, in the sequence of the association with the logical block addresses, a first region used for replenishing the defective region excluded by the logical block addresses and a second region for exchanging the defective regions generated with the use of the disc. These first and second regions are used by the slipping list and the exchange list as now explained.

The defect list region includes a slipping list as a first table for holding the relation of correspondence between the physical block addresses and the logical block addresses. This slipping list records the position of the defective region, such as defective sector, for detecting the defective region and for slipping, that is skipping, the defective region, usually at the time of shipment from the plant.

Also, the defective sector table for slipping and the associating table between the logical block addresses and the physical block addresses for sector replacement are put just ahead of the leading end position of the logical block addresses, and/or are placed in a region outside of the relation of correspondence to the logical block addresses further inside or outside the switching position of the physical block addresses from the lower surface to the upper surface or from the upper surface to the lower surface. The same table information is recorded in these regions.

If the defective region is recorded in the slipping list, this defective region is skipped in the relation of correspondence between the physical block addresses and the logical block addresses. Therefore, the logical block addresses proceed in the increasing address direction with respect to the physical block addresses. The region which is now required in order to procure the logical block addresses by this slipping is secured in the spare region.

The defective region has an exchange list, that is an alternation list, which is a second table for holding the relation of correspondence of exchange of the defective region which has been produced with the use of the disc. This exchange list holds address pairs for the defective regions such as defective sectors and exchange regions for these defective regions provided in the spare region.

The slipping list and the exchange list hold the relation of correspondence between the physical block addresses and the logical block addresses, while the control from the host computer is accorded by the logical block addresses and the physical accessing from the head to the disc is specified by the physical block addresses. Therefore, reference needs to be had to these lists when the disc is in use, such as when the disc starts to be used or when the disc is inserted into the recording/reproducing apparatus.

Since the spare region and the defective region are provided at a radially mid portion between the innermost and outermost recording tracks on the lower disc surface, there is only little risk of dust and dirt becoming affixed thereto to produce defects, such that the crucial information held by the spare region or the defective region can be held more reliably. That is, the lower disc surface is less susceptible to defects due to dust deposition.

The defect lists are recorded not only at the logical address beginning point but also on the radially inner side of the innermost recording track and on the radially outer side of the outermost recording track in the information areas on the upper and lower disc surfaces. If the defect lists are recorded in this manner in plural positions on the disc, by recording the defect lists in redundancy in plural positions, the contents of the defect lists, accommodating the crucial information, namely the relation of correspondence between the physical block addresses and the logical block addresses, can be preserved reliably. Thus, even if several defect lists are lost, reference can be had to the remaining defect lists.

If the disc is not in use, the head is locked at a shipping position which is the fixed position on the inner side of the innermost rim or on the outer side of the outermost rim of the disc. If the disc starts to be used, the head lock at the shipping position is released. If the defect lists are provided on the inner side of the innermost rim or on the outer side of the outermost rim of the disc, the head can reach the defect lists from the shipping position in a shorter time when the disc starts to be used.

That is, if the head is locked on the inner side of the innermost rim or on the outer side of the outermost rim of the disc, it is sufficient if the defect lists provided on the inner side of the innermost rim or on the outer side of the outermost rim of the disc are accessed, respectively, thus shortening the access time.

Also, the defect lists are provided at the same position on the upper and lower disc surfaces, so that, if the defect lists cannot be read by one of the magnetic heads 3a, 3b, the defect lists provided on the opposite side surface can be immediately read out by the other of the magnetic heads 3a, 3b without the necessity of causing head movement.

The defect list includes a slipping list as a first table and an exchange list as a second table. If the boundary between these lists is fixed, there is a fear that an unused area be produced. In order to prevent this from occurring, the boundary is rendered variable. That is, the slipping list, set at the time of shipment from the factory, can be rewritten by re-formatting. As for the exchange list, the number of times of exchange tends to be increased with re-formatting. It is therefore convenient if the boundary is rendered variable depending on the respective capacities.

If, for example, the number of unit bytes of slipping lists for recording the addresses of the defective sectors is three bytes, the exchange list records the defective sectors and the addresses of the sectors replacing the defective sectors, so that the number of unit bytes of the slipping lists is six bytes.

If, in this case, the boundary between the slipping list and the exchange list is fixed, and the slipping list is filly charged on the occasion of re-formatting, it becomes impossible to shift the registration of the defective sectors from the exchange list to the slipping list. If conversely the boundary between the slipping list and the exchange list is movable, it is possible to cause the movement from the exchange list to the slipping list at all times.

If a defective region is newly produced, it is necessary to update all defect lists on the disc in which to register the defective regions. It is however unnecessary to update the defect lists immediately on occurrence of defective regions since the updating can be performed at a time when disconnecting the power source or when taking out the disc from the device.

A plurality of the defect lists are provided at the same positions on the upper and lower disc surfaces. If the defect lists are provided in this manner at the same positions on the upper and lower disc surfaces, access to the lists may be had without the necessity of causing head movement. Moreover, since plural defect lists are provided, the contents of the defect lists can be preserved reliably.

In this disc, there is recorded a table for holding the relation of correspondence between the physical block addresses and the logical block addresses. This table, held by the disc, and holding the above-mentioned relation of correspondence, is made up of a slipping list and an exchange list. The slipping list is used for slipping a defective region, such as the defective sectors/ defective tracks found on initialization at the time of shipment from the factory by recording such defective region. The exchange list, on the other hand, is used for recording a new defective region produced with lapse of time as a pair with another region and substituting the other region for the new defective region.

The region slipping, or so-called slipping, is basically executed at the time of shipment from the factory. In this case, data is recorded on the totality of sectors as a format. The written data then is read out and errors are located. If errors are located, these are registered in the slipping list. The sectors, thus registered, are defective and hence are not used.

The defect list includes a disc structure table DST for holding the information on the disc. This disc structure table is written in a maintenance region in which the defect lists are written. Specifically, with the disc 100 shown for example in FIG. 2, the DST is recorded in a recording track next following the outer rim side of the second recording track on the lower surface of the disc 100 or in a recording track next following the inner rim side of the fourth recording track on the upper surface of the disc 100.

The DST 53 is made up of 512 bytes, as shown in FIG. 5, and records therein the disc manufacturer, disc strategy etc. that is, in the 0th byte, an ID for identifying the DST, such as "FE" in hexadecimal notation. In the first to tenth bytes, next following the 0th byte, the name of the disc manufacturer is recorded in ASCII notation. From the 200th byte on, the second defective region, that is the start address of the exchange list, is recorded.

In the DST, plural disc strategies are recorded. As the disc strategies, the recording current, converted to an integer number by suitable conversion, is recorded.

In the DST, there may be recorded the information on the disc manufacturer, such as data of manufacture or serial numbers, slipping list start address, recording conditions, reproducing conditions, and the disc format information. The DST may also be used for assuring interchangeability for a high-density large-capacity magnetic recording medium which may be introduced in future. The drive for driving the disc of the recording medium is designed not to accept mediums other than the current first-generation medium (version 1.0).

In addition to the slipping list, the DST is necessarily recorded on a formatted disc. In the defect list, since the boundary between the slipping list as the first defective region and the exchange list as the second defective region is not fixed, the DST needs to be read out for accessing to the exchange list. If no defective region has been produced with use of the disc, such that it is unnecessary to exchange the defective region, a void exchange list is recorded as the defect list.

An illustrative structure of the defect list is now explained with reference to FIG. 6, in which each block is made up of, for example, 30 sectors.

In the initial block, a slipping list 51 is provided as from the first address of the physical block addresses. Next to the slipping list 51 is assigned an exchange list 52. In the last one sector is recorded a disc structure table 53.

The second block is assigned to the exchange list, except that the disc structure table 53 is recorded in the last block. In the exchange list, there are sequentially recorded address pairs of addresses of new defective regions produced with use of the disc and addresses of spare region exchanged for the defective regions. The third and the following blocks represent an information regions 54 in which to record data. The block capacity and the arrangement of the defect lists are not limited to this illustrative structure.

In the present embodiment, there is provided a spare region for replenishment in readiness for slipping performed at the time of shipment from the factory or exchange of defective regions produced with use of the disc. Thus, a pre-set recording capacity of the disc can be maintained unless the volume of the regions required for slipping or exchange of defective regions exceeds that of the spare region, so that the disc can be used as an exchangeable recording medium.

The difference between the hard disc and the floppy disc in connection with the necessity for exchange of the recording medium is hereinafter explained.

In the following description, it is assumed that the hard disc as a medium is not exchanged. Therefore, if, in a hard disc, the medium is fluctuated in capacity, the initial capacity of 256 Mbytes may be decreased to 248 or 252 Mbytes. This, however, is allowed for the HDD. Therefore, the slipping may be carried out at the outset, or the slipping is not executed, with the defective sectors not being used. By not using the slipping or defective sectors, the disc capacity is occasionally decreased.

Conversely, the floppy disc, which is an exchange medium, cannot be varied in its recording capacity. That is, if the floppy disc capacity is changed, it becomes impossible to execute disc-based disc copying between floppy discs. Thus, the floppy disc capacity needs to be maintained at all times at a constant value. Therefore, the decrease in the disc capacity due to defective sectors needs to be compensated at any rate.

The status of the defective regions, such as distribution, varies from disc to disc, so that, for recording/reproducing the disc by a recording/reproducing apparatus, it is necessary to read out the defect list provided on the disc in order to comprehend the relation of correspondence between the physical block addresses as the physical addresses and the logical block addresses as the logical addresses.

As discussed above, accessing from a host computer in the magnetic recording device is performed in units termed logical block addresses which are associated with the physical block addresses on the disc based on a certain rule. The processing of detecting physical block addresses defective in connection with association with the logical block addresses to exclude the detected physical block addresses from the relation of correspondence with the logical block addresses is indispensable. There is presented here a method for associating the logical block addresses and the physical block addresses which includes setting the leading end of the logical block addresses at a mid portion on the lower disc surface, proceeding sequentially towards the outer rim on the lower disc surface with the incrementing of the address numbers of the logical block addresses, and then proceeding from the outer rim to the inner rim on the upper disc surface to reach the radially mid portion on the lower disc surface from the inner rim on the lower disc surface to associate the logical block addresses with the physical block addresses. The method also includes setting a spare region for sector swapping in continuation to the last address of the logical block and an exchange region for sector replacement in continuation to the spare region. The method also includes recording on the disc a table having registered thereon defective sectors for sector swapping and an associating table between the logical block addresses and the physical block addresses for sector replacement. The method also includes putting these tabl of the switching point of the physical block addresses associated with the logical block addresses from the from the lower surface to the upper surface or from the upper surface to the lower surface.

There are occasions wherein the above-described recording medium is furnished accommodated in a cartridge. In such case, the cartridge accommodating the recording medium therein is designed so that it cannot be inserted in the upside down position into the cartridge accommodating device.

Although the foregoing description has been made of magnetic recording with the use of a magnetic material, the present invention is not limited to this particular configuration. For example, the present invention can be applied to an optical recording medium adapted for optical recording.

What is claimed is:

1. A substantially disc-shaped recording medium for recording information signals along a plurality of substantially concentric recording tracks provided on a first major surface and a second major surface thereof, wherein an association of logical block addresses to said recording tracks is made in a sequence in which the logical block addresses proceed, in a recordable information area, with a first recording track at a radially mid portion between an innermost recording track and an outermost recording track on said first major surface as a logical starting point, towards the outer rim as far as a second recording track, then from a third recording at a mid portion between an innermost recording track and an outermost recording track on said second major surface towards the inner rim as far as a fourth recording track, then from the next recording track on the outer rim side of the second recording track on the first major surface towards the outer rim, until reaching the outermost recording track on the first major surface, said logical block addresses then proceeding towards the inner rim from the outermost recording track on the second major surface, so as to skip the third recording track and the fourth recording track, until reaching the innermost recording track on the second major surface, said logical block addresses then proceeding from the innermost rim on the first major surface towards the outer rim until reaching the recording track directly ahead of the first recording track.

2. The recording medium according to claim 1 wherein said first major surface is one of the upper or lower disc surface and said second major surface is the other disc surface.

3. The recording medium according to claim 1 wherein a spare region is provided on the inner rim side of said beginning point and wherein said spare region is made up of a first region and a second region, in the order of association to said logical block addresses, in terms of physical block addresses of said recording tracks and logical block addresses corresponding to the physical block addresses less unusable defective regions, said first region being used for supplementing the defective regions removed by said logical block addresses and said second region being used for exchanging the defective regions newly produced with the use of the disc.

4. The recording medium according to claim 1 wherein a defect list holding the relation of correspondence between said physical block addresses and said logical block addresses and a second table holding the relation of correspondence of exchanging of the newly produced defective regions is recorded from a first recording track to a second recording track on said first major surface of the recording medium and from the third recording track to the fourth recording track on said first major surface of the recording medium, respectively, with the boundary between the region of the first table and the region of the second table in the region recording said defect list being movable.

5. The recording medium according to claim 4 wherein the defect list is recorded on the inner side of the innermost track and on the outer side of the outermost track of recordable information tracks in said information regions of the first and second major surfaces of the recording medium.

6. The recording medium according to claim 4 wherein the defect list includes a table at least containing the information on the manufacture of the recording medium and the start position of the first region and/or the second region.

7. The recording medium according to claim 4 wherein, in re-initializing the recording medium, movement is made from the second table to the first table with the relation of correspondence of said second table contained in said defect list as the relation of correspondence of said first table.

8. The recording medium according to claim 1 wherein a disc structure table holding the information on the disc is recorded in the next recording track on the outer rim of the second recording track and in the next recording track on the inner rim of the fourth recording track.

9. A recording/reproducing apparatus for recording/reproducing information signals for a substantially disc-shaped recording medium for recording information signals along a plurality of substantially concentric recording tracks provided on a first major surface and a second major surface thereof, comprising:

information signal readout means for reading out information signals from said recording medium;

physical block address detection means for detecting the physical block addresses from information signals read out by said readout means from the recording medium;

table detection means for detecting a table holding the relation of correspondence between logical block addresses and physical block addresses by having reference to the physical block addresses detected by said physical block address detection means, said table being provided in each of a recording track at a mid portion between the innermost recording track and the outermost recording track on the first major surface and in a recording track at a mid portion between the innermost recording track and the outermost recording track on the second major surface, in a recordable information region of said recording medium, said table stating the proceeding sequence of the logical block addresses in which the logical block addresses proceed, in said recordable information area, with a first recording track at a radially mid portion between an innermost recording track and an outermost recording track on said first major surface as a logical starting point, towards the outer rim as far as a second recording track, then from a third recording track at a mid portion between an innermost recording track and an outermost recording track on said second major surface towards the inner rim as far as a fourth recording track, then from the next recording track on the outer rim side of the second recording track on the first major surface towards the outer rim, until reaching the outermost recording track on the first major surface, said logical block addresses then proceeding towards the inner rim from the outermost recording track on the second major surface, so as to skip the third recording track and the fourth recording track, until reaching the innermost recording track on the second major surface, said logical block addresses then proceeding from the innermost rm on the first major surface towards the outer rim until reaching the recording track directly ahead of the first recording track, and address converting means for reciprocally converting the physical block addresses and the logical block addresses based on the physical block addresses detected by said physical block address detection means and said table detected by said table detection means.

10. The recording/reproducing apparatus according to claim 9 wherein said information signal readout means includes a pair of heads provided facing the first and second major surfaces of the disc-shaped recording medium, said magnetic heads facing each other with the disc-shaped recording medium in-between.

11. A recording/reproducing method for recording/reproducing information signals for a substantially disc-shaped recording medium for recording information signals along a plurality of substantially concentric recording tracks provided on a first major surface and a second major surface thereof, comprising:

an information signal readout step for reading out information signals from said recording medium;

a physical block address detection step for detecting the physical block addresses from information signals read out by said readout step from the recording medium;

a table detection step for detecting a table holding the relation of correspondence between logical block addresses and physical block addresses by having reference to the physical block addresses detected by said physical block address detection step, said table being provided in a recording track at a mid portion between the innermost recording track and the outermost recording track on the first major surface and in a recording track at a mid portion between the innermost recording track and the outermost recording track on the second major surface, in a recordable information region of said recording medium, said table stating the proceeding sequence of the logical block addresses in which the logical block addresses proceed, in said recordable information area, with a first recording track at a radially mid portion between an innermost recording track and an outermost recording track on said first major surface as a logical starting point, towards the outer rim as far as a second recording track, then from a third recording track at a mid portion between an innermost recording track and an outermost recording track on said second major surface towards the inner rim as far as a fourth recording track, then from the next recording track on the outer rim side of the second recording track on the first major surface towards the outer rim, until reaching the outermost recording track on the first major surface, said logical block addresses then proceeding towards the inner rim from the outermost recording track on the second major surface, so as to skip the third recording track and the fourth recording track, until reaching the innermost recording track on the second major surface, said logical block addresses then proceeding from the innermost rim on the first major surface towards the outer rim as far as the recording track directly ahead of the first recording track, and an address converting step for reciprocally converting the physical block addresses and the logical block addresses based on the physical block addresses detected by said physical block address detection step and said table detected by said table detection step.

12. A substantially disc-shaped recording medium for recording information signals along a plurality of substantially concentric recording tracks provided on a first major surface and a second major surface thereof, wherein an association of logical block addresses to said recording tracks is made in a sequence in which the logical block addresses proceed, in a recordable information area, with a first recording track at a radially mid portion between an innermost recording track and an outermost recording track on said first major surface as a logical starting point, towards the outer rim, until reaching the outermost recording track on said first major surface, said logical block addresses then proceeding from the outermost recording track on said second major surface towards the inner rim side, until reaching the innermost recording track on said second major surface, said logical block addresses then proceeding from the innermost rim towards the outer rim of said first major surface.

13. The recording medium according to claim 12 wherein said first major surface is one of the upper or lower disc surface and said second major surface is the other disc surface.

14. The recording medium according to claim 12 wherein a spare region is provided on the inner rim side of said beginning point and wherein said spare region is made up of a first region and a second region, in the order of association to said logical block addresses, in terms of physical block addresses of said recording tracks and logical block addresses corresponding to the physical block addresses less unusable defective regions, said first region being used for supplementing the defective regions removed by said logical block addresses and said second region being used for exchanging the defective regions newly produced with the use of the disc.

15. The recording medium according to claim 14 wherein a defect list holding the relation of correspondence between said physical block addresses and said logical block addresses and a second table holding the relation of correspondence of exchanging of the newly produced defective regions is recorded towards the inner rim side of said beginning point of the recording track on the first major surface of the recording medium, with the boundary between the region of the first table and the region of the second table in the region recording said defect list being movable.

16. The recording medium according to claim 15 wherein the defect list is recorded on the inner side of the innermost track and on the outer side of the outermost track of recordable information tracks in said information regions of the first and second major surfaces of the recording medium.

17. The recording medium according to claim 15 wherein the defect list includes a table at least containing the information on the manufacture of the recording medium and the start position of the first region and/or the second region.

18. The recording medium according to claim 15 wherein a disc structure table holding the information on the disc is recorded in the next recording track on the outer rim of the second recording track and in the next recording track on the inner rim of the fourth recording track.

19. A recording/reproducing apparatus for recording/reproducing information signals for a substantially disc-shaped recording medium for recording information signals along a plurality of substantially concentric recording tracks provided on a first major surface and a second major surface thereof, comprising:

information signal readout means for reading out information signals from said recording medium;

physical block address detection means for detecting the physical block addresses from information signals read out by said readout means from the recording medium;

table detection means for detecting a table holding the relation of correspondence between logical block addresses and physical block addresses by having reference to the physical block addresses detected by said physical block address detection means, said table being provided in a recording track at a mid portion between the innermost recording track and the outermost recording track on the first major surface and in a recording track at a mid portion between the innermost recording track and the outermost recording track on the second major surface, in a recordable information region of said recording medium, said table stating the proceeding sequence of the logical block addresses in which the logical block addresses proceed towards an outer rim, in the recordable information area in said recording medium, with the radially mid portion as the logical starting point, until reaching the outermost recording track on said first major surface, said logical block addresses then proceeding towards the inner rim side from the outermost recording track on said second major surface, until reaching the innermost recording track on said second major surface, said logical block addresses then proceeding from the innermost rim of the first major surface towards the outer rim; and address converting means for reciprocally converting the physical block addresses and the logical block addresses based on the physical block addresses detected by said physical block address detection means and said table detected by said table detection means.

20. The recording/reproducing apparatus according to claim 19 wherein said information signal readout means includes a pair of heads provided facing the first and second major surfaces of the disc-shaped recording medium, said magnetic heads facing each other with the disc-shaped recording medium in-between.

21. A recording/reproducing method for recording/reproducing information signals for a substantially disc-shaped recording medium for recording information signals along a plurality of substantially concentric recording tracks provided on a first major surface and a second major surface thereof, comprising:

an information signal readout step for reading out information signals from said recording medium;

a physical block address detection step for detecting the physical block addresses from information signals read out by said readout step from the recording medium;

a table detection step for detecting a table holding the relation of correspondence between logical block addresses and physical block addresses by having reference to the physical block addresses detected by said physical block address detection step, said table being provided in a recording track at a mid portion between the innermost recording track and the outermost recording track on the first major surface and in a recording track at a mid portion between the innermost recording track and the outermost recording track on the second major surface, in a recordable information region of said recording medium, said table stating the proceeding sequence of the logical block addresses in which the logical block addresses proceed towards an outer rim, in the recordable information area in said recording medium, with the radially mid portion as the logical starting point, until reaching the outermost recording track on said first major surface, said logical block addresses then proceeding towards the inner rim side from the outermost recording track on said second major surface, until reaching the innermost recording track on said second major surface, said logical block addresses then proceeding from the innermost rim of the first major surface towards the outer rim; and an address converting step for reciprocally converting the physical block addresses and the logical block addresses based on the physical block addresses detected by said physical block address detection step and said table detected by said table detection step.

* * * * *

UNITED STATES PATENT AND TRADEMARK OFFICE
CERTIFICATE OF CORRECTION

PATENT NO. : 6,246,537 B1
DATED : June 12, 2001
INVENTOR(S) : Kyoichi Shirane

It is certified that error appears in the above-identified patent and that said Letters Patent is hereby corrected as shown below:

Column 1,
Line 49, change "his" to -- this --.

Column 2,
Line 9, change "de-vice" to -- device --.

Column 3,
Lines 1 and 51, after "thereof" insert a period.

Column 5,
Line 23, after "thereof" insert a period.

Column 7,
Line 11, after "addresses," insert -- so that --.

Column 8,
Line 39, change "etc" to --, etc. --.
Line 41, change "ether" to -- further --.

Column 9,
Line 19, delete "towards the outer rim".

Column 12,
Line 5, delete "an"; change "address" to -- addresses --.
Line 37, after "defects" insert a comma.

Column 14,
Line 58, change "beads" to -- heads --.

Column 15,
Line 61, after "strategy" insert a comma.

Column 17,
Line 20, change "swaping" to -- swapping --.
Line 27, change "table" to -- tables --.
Line 65, change "componetns" to -- components --.

UNITED STATES PATENT AND TRADEMARK OFFICE
CERTIFICATE OF CORRECTION

PATENT NO. : 6,246,537 B1
DATED : June 12, 2001
INVENTOR(S) : Kyoichi Shirane

It is certified that error appears in the above-identified patent and that said Letters Patent is hereby corrected as shown below:

Column 18,
Line 4, change "surfacers" to -- surfaces --.
Line 8, change "anda" to -- and a --.
Line 29, change "etc" to -- , etc. --.
Line 62, change "an" to -- a --.

Column 19,
Line 40, change "ran" to -- run --.

Column 20,
Line 65, change "an" to -- a --.

Column 21,
Line 12, change "had" to -- made --.
Line 40, change "mod" to -- mid --.
Line 54, after "defects" insert a comma.

Column 22,
Line 30, delete "spare" (first occurrence).
Line 52, after "as" insert -- a --.

Column 24,
Line 13, change "filly" to -- fully --.
Line 65, after "strategy" insert a comma.

Column 25,
Line 41, change "regions" to -- region --.

Column 26,
Line 41, change "tabl" to -- tables --.
Line 43, delete "from the" (first occurrence).

Column 27,
Line 2, after "recording" insert -- track --.

Column 28,
Line 42, change "rm" to -- rim --.

UNITED STATES PATENT AND TRADEMARK OFFICE
CERTIFICATE OF CORRECTION

PATENT NO. : 6,246,537 B1
DATED : June 12, 2001
INVENTOR(S) : Kyoichi Shirane

It is certified that error appears in the above-identified patent and that said Letters Patent is hereby corrected as shown below:

<u>Column 32,</u>
Lines 11 and 16, change "towards" to -- toward --.

Signed and Sealed this

Fifth Day of March, 2002

Attest:

Attesting Officer

JAMES E. ROGAN
*Director of the United States Patent and Trademark Office*